(12) United States Patent
Murakami et al.

(10) Patent No.: US 8,784,248 B2
(45) Date of Patent: Jul. 22, 2014

(54) ENGINE START CONTROL DEVICE OF HYBRID VEHICLE

(75) Inventors: Akira Murakami, Gotenba (JP);
Hiroyuki Ogawa, Susono (JP);
Takahiro Shiina, Susono (JP); Daisuke Tomomatsu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 113 days.

(21) Appl. No.: 13/638,401

(22) PCT Filed: Mar. 30, 2010

(86) PCT No.: PCT/JP2010/055757
§ 371 (c)(1),
(2), (4) Date: Sep. 28, 2012

(87) PCT Pub. No.: WO2011/121743
PCT Pub. Date: Oct. 6, 2011

(65) Prior Publication Data
US 2013/0019712 A1    Jan. 24, 2013

(51) Int. Cl.
| F16H 3/72 | (2006.01) |
| F16H 37/06 | (2006.01) |
| F16H 15/48 | (2006.01) |
| F16H 13/08 | (2006.01) |
| B60K 6/445 | (2007.10) |

(52) U.S. Cl.
USPC ........ 475/5; 475/3; 475/4; 475/189; 475/196; 180/65.235

(58) Field of Classification Search
USPC ................. 475/3, 4, 5, 189, 196; 180/65.235
See application file for complete search history.

(56) References Cited

U.S. PATENT DOCUMENTS

| 2,182,458 A | * | 12/1939 | Vickers ........................ 74/388 R |
| 3,293,947 A | * | 12/1966 | Chery ............................ 475/189 |
| 7,011,600 B2 | | 3/2006 | Miller et al. |
| 7,710,252 B2 | | 5/2010 | Kaya |
| 7,972,237 B2 | | 7/2011 | Ota |

(Continued)

FOREIGN PATENT DOCUMENTS

| JP | 9 170533 | 6/1997 |
| JP | 2003 278856 | 10/2003 |

(Continued)

OTHER PUBLICATIONS

International Search Report Issued Jun. 1, 2010 in PCT/JP10/055757 Filed Mar. 30, 2010.

(Continued)

Primary Examiner — Tisha Lewis
(74) Attorney, Agent, or Firm — Oblon, Spivak, McClelland, Maier & Neustadt, L.L.P.

(57) ABSTRACT

In an engine start control device of a hybrid vehicle including a power dividing mechanism which has a sun roller, a carrier, and a first disc with which a rotating shaft of a first motor/generator, an output shaft of an engine, and an output shaft of a second motor/generator are coupled, respectively and by which differential rotating operations between the sun roller, the carrier, and the first disc are controlled using an alignment chart on which rotation speeds of the sun roller, the carrier, and the first disc are disposed in the sequence of the sun roller, the carrier, the first disc and shown by straight lines.

20 Claims, 11 Drawing Sheets

(56) References Cited

U.S. PATENT DOCUMENTS

| | | |
|---|---|---|
| 8,308,593 B2 | 11/2012 | Kumazaki et al. |
| 8,430,777 B2 * | 4/2013 | Yamada et al. .......... 475/5 |
| 8,523,723 B2 | 9/2013 | Seo et al. |
| 8,628,443 B2 | 1/2014 | Miller et al. |
| 2003/0181276 A1 | 9/2003 | Minagawa et al. |
| 2004/0171452 A1 | 9/2004 | Miller et al. |
| 2007/0142161 A1 | 6/2007 | Miller |
| 2013/0024062 A1 | 1/2013 | Murakami et al. |

FOREIGN PATENT DOCUMENTS

| | | |
|---|---|---|
| JP | 2005-138803 | 6/2005 |
| JP | 2005 278281 | 10/2005 |
| JP | 2006-199077 | 8/2006 |
| JP | 2006 519349 | 8/2006 |
| JP | 2007-084065 | 4/2007 |
| JP | 2008 222173 | 9/2008 |
| JP | 2009 40132 | 2/2009 |
| JP | 2009 190693 | 8/2009 |
| JP | 2009-227195 | 10/2009 |
| JP | 2009 255683 | 11/2009 |
| JP | 2010-000935 | 1/2010 |

OTHER PUBLICATIONS

International Search Report issued Jun. 1, 2010, in PCT/JP2010/055756, filed Mar. 30, 2010 (with English language translation).

Office Action mailed Feb. 27, 2014, in co-pending U.S. Appl. No. 13/638,728.

* cited by examiner

ENGINE START CONTROL DEVICE OF HYBRID VEHICLE

FIELD

The present invention relates to an engine start control device of a hybrid vehicle including at least an engine and an electric rotating machine as a power source.

BACKGROUND

Conventionally, hybrid vehicles including an engine and an electric rotating machine as a power source are known. Further, in this type of hybrid vehicles, there are also known hybrid vehicles provided with a power dividing mechanism capable of distributing input power at a predetermined distribution ratio and outputting the distributed input power.

For example, Patent Literature 1 shown below discloses a hybrid vehicle provided with a differential mechanism (power dividing mechanism) composed of a planetary gear mechanism including a carrier with which an output shaft of an internal combustion engine (engine) is coupled, a sun gear with which a rotating shaft of a first motor/generator (electric rotating machine) is coupled, and a ring gear with which a drive wheel side is coupled. The hybrid vehicle of the Patent Literature 1 is also provided with another differential mechanism in addition to the power dividing mechanism, and the another differential mechanism includes a pinion gear with which the output shaft of the internal combustion engine is coupled and a sun gear with which the rotating shaft of the first motor/generator is coupled via a clutch and is used as a start differential mechanism of the internal combustion engine. When the internal combustion engine of the hybrid vehicle starts, a rotation speed of the rotating shaft of the first motor/generator is reduced by connecting the rotating shaft of the first motor/generator to the start differential mechanism via a clutch and transmitted to the output shaft of the internal combustion engine, and the internal combustion engine is cranked.

Patent Literature 2 shown below discloses a drive system of a hybrid vehicle provided with a distribution mechanism (power dividing mechanism) composed of a planetary gear mechanism including a carrier with which an output shaft of an engine is coupled, a sun gear with which a rotating shaft of a first motor/generator is coupled, and a ring gear with which a rotating shaft of a second motor/generator is coupled as well as the rotating shaft of the second motor/generator is also coupled with a drive wheel side. In the hybrid vehicle of Patent Literature 2, when the engine is started, rotation torque of the first motor/generator is transmitted to the engine via the power dividing mechanism in a state that a vehicle is stopped by a parking brake and the like and the engine is cranked.

Patent Literature 3 shown below discloses a drive system of a hybrid vehicle provided with a power dividing mechanism for distributing power of an engine to a first motor/generator and to a drive wheel side at a predetermined distribution ratio. The drive system employs a planetary cone mechanism capable of changing the distribution rate as the power dividing mechanism. Further, Patent Literature 4 shown below discloses a continuously variable transmission provided with a continuously variable mechanism, which includes balls (rolling members) clamped by an input disc and an output disc and changes a transmission ratio by adjusting a tilt angle of the balls, and a planetary gear mechanism (differential mechanism) with which one of rotating elements is coupled with an output shaft of the continuously variable mechanism. Specifically, Patent Literature 4 describes the planetary gear mechanism configured such that a sun gear as one of the rotating elements is coupled with the output shaft of the continuously variable mechanism, a carrier is coupled with a drive wheel side, and a ring gear is coupled with an output side of a drive force source via a gear group.

CITATION LIST

Patent Literature

Patent Literature 1: Japanese Patent Application Laid-open No. 2009-190693
Patent Literature 2: Japanese Patent Application Laid-open No. H09-170533
Patent Literature 3: Japanese Patent Application Laid-open No. 2009-040132
Patent Literature 4: Japanese National Publication of International Patent Application No. 2006-519349

SUMMARY

Technical Problem

However, the hybrid vehicle of the Patent Literature 1 is disadvantageous in that since the dedicated start differential mechanism and clutch are necessary to start the engine, a size of a drive system is increased at least by the size of the start differential mechanism and the clutch. In the hybrid vehicle of Patent Literature 2, since the first motor/generator capable of generating a large amount of output torque for the cranking operation is necessary to start the engine, there is a high possibility that the first motor/generator having a large physical constitution is mounted and a drive device is increased in size.

Accordingly, an object of the present invention is to provide an engine start control device of a hybrid vehicle capable of improving the disadvantages of the conventional examples and suppressing an increase in size of a drive system for starting an engine.

Solution to Problem

In order to achieve the above mentioned object, an engine start control device of a hybrid vehicle according to the present invention includes a differential mechanism that includes first to third rotating elements with which a rotating shaft of a first electric rotating machine, an output shaft of an engine, and a rotating shaft of a second electric rotating machine are coupled, respectively and by which differential rotating operations between the first to third rotating elements are controlled using an alignment chart on which rotation speeds of the first to third rotating elements are disposed in the sequence of the first rotating element, the second rotating element, and the third rotating element and shown by straight lines, wherein the differential mechanism can change a rotation ratio obtained by dividing a rotation speed of the first rotating element by a rotation speed of the third rotating element, and when a rotation of the first electric rotating machine is transmitted to the output shaft of the engine and the engine is cranked at the time the engine starts, a rotation ratio between the first rotating element and the third rotating element is controlled on the alignment chart so that the rotation speed of the first rotating element is increased.

Here, it is desirable that the differential mechanism includes a fourth rotating element having a center axis of rotation common to the first to third rotating elements and rolling members which have a center axis of rotation different from the center axis of rotation as well as can transmit power via contact portions between the first rotating element, the third rotating element, and the fourth rotating element and are held by the second rotating element, and the differential mechanism desirably changes the rotation ratio according to a tilt angle of the rolling members.

Further, it is desirable that the differential mechanism is configured such that the first to third rotating elements has a common center axis of rotation as well as the differential mechanism includes rolling members which are disposed in contact between a radially outside portion of the first rotating element and a radially inside portion of the third rotating element, respectively, held by the second rotating element, and have a center axis of rotation different from the center axis of rotation. In this case, when the rotation ratio is controlled, the rotation ratio is desirably made smaller than a predetermined value on the alignment chart.

The differential mechanism desirably includes a fourth rotating element which has a center axis of rotation common to the first to third rotating elements and is disposed in a state that a radially inside portion is caused to be in contact with the rolling members, can transmit power via contact portions between the first rotating element, the third rotating element, and the fourth rotating element, and the rolling members, and can change the rotation ratio according to a tilt angle of the rolling members.

Further, The differential mechanism is desirably configured such that the first to third rotating elements have a common center axis of rotation as well as the differential mechanism desirably includes rolling members which are disposed in contact between a radially inside portion of the first rotating element and a radially outside portion of the third rotating element, respectively, held by the second rotating element, and a have center axis of rotation different from the center axis of rotation. In this case, when the rotation ratio is controlled, the rotation ratio is desirably made larger than a predetermined value on the alignment chart.

The differential mechanism desirably includes a fourth rotating element which has a center axis of rotation common to the first to third rotating elements and is disposed in a state that a radially inside portion is caused to be in contact with the rolling members, can transmit power via contact portions between the first rotating element, the third rotating element, and the fourth rotating element, and the rolling members, and can change the rotation ratio according to a tilt angle of the rolling members.

Further, in order to achieve the above mentioned object, an engine start control device of a hybrid vehicle according to the present invention includes a differential mechanism that includes first to fourth rotating elements with which a rotating shaft of a first electric rotating machine, an output shaft of an engine, an output shaft toward a drive wheel side, and a rotating shaft of a second electric rotating machine are coupled, respectively and by which differential rotating operations between the first to fourth rotating elements are controlled using an alignment chart on which rotation speeds of the first to fourth rotating elements are disposed in the sequence of the first rotating element, the second rotating element, the third rotating element, and the fourth rotating element and shown by straight lines, wherein the differential mechanism can change a rotation ratio obtained by dividing a rotation speed of the first rotating element by a rotation speed of the third rotating element and a rotation ratio obtained by dividing the rotation speed of the first rotating element by a rotation speed of the fourth rotating element, and when a rotation of the first electric rotating machine is transmitted to the output shaft of the engine and the engine is cranked at the time the engine starts, a rotation ratio between the first rotating element and the third rotating element and a rotation ratio between the first rotating element and the fourth rotating element are controlled on the alignment chart so that the rotation speed of the first rotating element is increased.

Here, it is desirable that the differential mechanism has a center axis of rotation different from a center axis of rotation in the first to fourth rotating elements and includes rolling members which can transmit power via contact portions between the first rotating element, the third rotating element, and the fourth rotating element and held by the second rotating element, and the differential mechanism desirably changes the rotation ratio according to a tilt angle of the rolling members.

Further, it is desirable that the differential mechanism is configured such that the first to fourth rotating elements have a common center axis of rotation as well as the differential mechanism includes rolling members which are disposed in contact between a radially outside portion of the first rotating element and a radially inside portion of the third rotating element, respectively, held by the second rotating element, and have a center axis of rotation different from the center axis of rotation. In this case, when the rotation ratio is controlled, a rotation ratio between the first rotating element and the third rotating element is desirably made smaller than a predetermined value as well as a rotation ratio between the first rotating element and the fourth rotating element is made larger than a predetermined value the on the alignment chart.

The differential mechanism can desirably transmit power via contact portions between the first rotating element, the third rotating element, and the fourth rotating element, and the rolling members, dispose the fourth rotating element in a state that a radially inside portion is in contact with the rolling members as well as change the rotation ratio according to a tilt angle of the rolling members.

Further, it is desirable that the differential mechanism is configured such that the first to fourth rotating elements have a common center axis of rotation as well as the differential mechanism includes rolling members which are disposed in contact between a radially inside portion of the first rotating element and a radially outside portion of the third rotating element, respectively, held by the second rotating element, and have a center axis of rotation different from the center axis of rotation. In this case, when the rotation ratio is controlled, a rotation ratio between the first rotating element and the third rotating element is desirably made larger than a predetermined value as well as a rotation ratio between the first rotating element the fourth rotating element is desirably made smaller than a predetermined value the on the alignment chart.

The differential mechanism can desirably transmit power via contact portions between the first rotating element, the third rotating element, and the fourth rotating element, and the rolling members, dispose the fourth rotating element in a state that a radially inside portion is in contact with the rolling members as well as change the rotation ratio according to a tilt angle of the rolling members.

Further, it is possible that the differential mechanism includes a sun roller as the first rotating element, a carrier as the second rotating element, a first disc as the third rotating element, a second disc as the fourth rotating element, and planetary balls as the rolling members.

Further, it is possible that the differential mechanism includes a first disc as the first rotating element, a carrier as the second rotating element, a sun roller as the third rotating element, a second disc as the fourth rotating element, and planetary balls as the rolling members.

It is desirable that when the cranking is executed, a rotation speed of the second rotating element is set to at least a rotation speed necessary for cranking as well as a rotation speed of the third rotating element is reduced to 0 at the maximum on the alignment chart.

Further, it is desirable that when the cranking is executed, the rotation ratio is controlled when a temperature of a secondary battery as a power supply source to the first electric rotating machine is a low temperature or a high temperature than when an ordinary temperature.

Advantageous Effects of Invention

Since the engine start control device of the hybrid vehicle according to the present invention can increase the rotation speed of the first rotating element, torque generated by the first electric rotating machine for cranking can be reduced. Accordingly, since the first electric rotating machine can generate the torque for the cranking even by the small amount of torque, a rotation speed of the engine can be increased up to a rotation speed necessary to start the engine. Accordingly, the first electric rotating machine can be made compact by reducing its capacity, which can make the drive system of the hybrid vehicle compact. Further, since no special dedicated parts are necessary to start the engine, the drive system can be made more compact.

DESCRIPTION OF EMBODIMENTS

Embodiments of an engine start control device of a hybrid vehicle according to the present invention will be explained below in detail based on drawings. Note that the present invention is not limited by the embodiments.

First Embodiment

A first embodiment of the engine start control device of the hybrid vehicle according to the present invention will be explained based on FIGS. 1 to 6.

The engine start control device of the first embodiment is composed of a control unit 1 (electronic control unit: ECU) illustrated in FIG. 1. The control unit 1 may have only a control function of the engine start control device or may have other control functions. The first embodiment employs the latter case.

First, the hybrid vehicle to which the engine start control device is applied, more specifically, a drive system of the hybrid vehicle will be described in detail based on FIG. 1.

Figure 1:
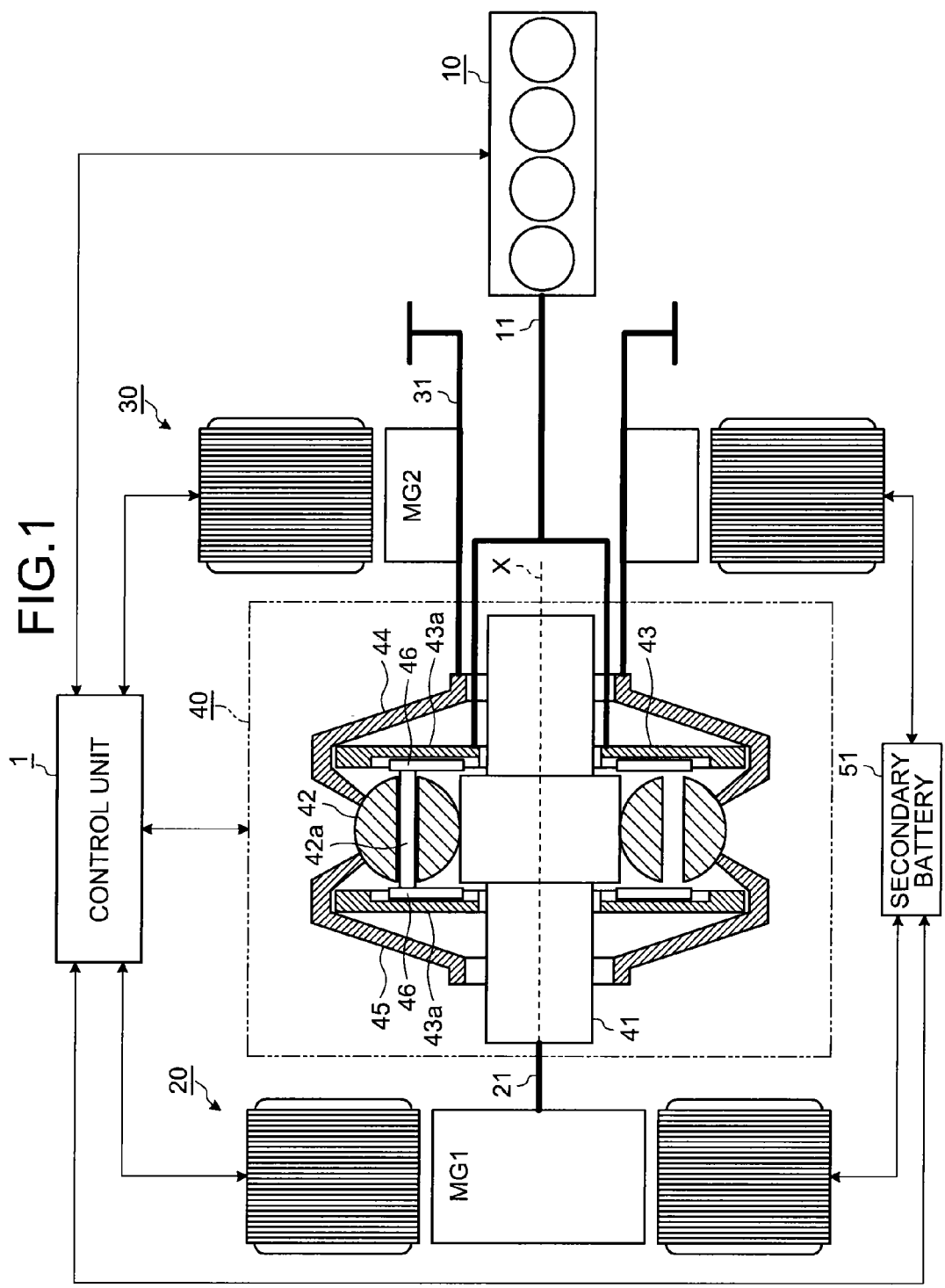
FIG. 1 is a view illustrating an engine start control device of a hybrid vehicle according to the present invention and a drive system of a first embodiment.

The drive system illustrated in FIG. 1 includes plural types of power sources and a power transmission system for transmitting power of the power sources to drive wheels (not illustrated) as drive force. As the power sources, there are prepared a mechanical power source which uses mechanical energy converted from heat energy as power and an electric power source which uses mechanical energy converted from electric energy as power.

The drive system includes an engine 10 for outputting mechanical power (engine torque) from an output shaft (crank shaft) 11 as the mechanical power source. An internal combustion engine and an external combustion engine are considered as the engine 10. The engine 10 permits operations such as fuel injection and ignition performed by the control unit 1.

The drive system uses first and second electric rotating machines 20, 30, which are configured as any of a motor, a generator capable performing a powering drive, or a motor/generator capable of performing both a powering drive and a regeneration drive, as electric power source.

Here, explanation will be made by exemplifying the motor/generator. Accordingly, hereinafter, the first and second electric rotating machines 20, 30 are called first and second motor/generators 20, 30 (MG 1, MG 2) respectively. The first and second motor/generators 20, 30 are configured as, for example, a permanent magnet type alternating current synchronous motor and can perform operations such as a powering drive operation by the control unit 1 via a not illustrated inverter. At the time of powering drive, the first and second motor/generators 20, 30 convert electric energy supplied from a secondary battery 51 to mechanical energy via the inverter and outputs mechanical power (motor torque) from rotating shafts 21, 31 which are disposed coaxially with a not illustrated rotor. In contrast, at the time of regeneration drive, when mechanical power (motor torque) is input to the first and second motor/generators 20, 30 from the rotating shafts 21, 31, the first and second motor/generators 20, 30 convert the mechanical energy to electric energy. The electric energy can be stored in the secondary battery 51 as electric power via the inverter and can be used as electric power when the other motor/generator performs the powering drive.

The power transmission system is prepared with a power dividing mechanism 40 which can distribute input power at a predetermined distribution ratio and output the distributed power. The power dividing mechanism 40 is configured as a differential mechanism which permits differential rotating operations between rotating elements. An explanation will be made exemplifying a so-called traction planetary gear mechanism composed of rotating elements.

The power dividing mechanism 40 includes a sun roller 41, plural planetary balls 42, a carrier 43, and first and second discs 44, 45 as the rotating elements. Among the rotating elements, the sun roller 41, the carrier 43, and the first and second discs 44, 45 have a common center axis of rotation X. In contrast, each planetary ball 42 has a center axis of rotation different from the center axis of rotation X and rotates (rotates on its center axis of rotation) and rotates (revolves) around the center axis of rotation X. Hereinafter, unless otherwise particularly described, a direction along the center axis of rotation X is called an axis direction and a direction about the center axis of rotation X is called a circumferential direction. A direction orthogonal to the center axis of rotation X is called a radial direction, and a side of the radial direction facing inside is called an inside radial direction and a side thereof facing outside is called an outside radial direction.

The sun roller 41 is located at a center of rotation of the power dividing mechanism 40 and is configured as, for example, a cylindrical rotary member having the center axis of rotation X as its center axis. An outer peripheral surface of the sun roller 41 acts as a rolling surface when the planetary balls 42 rotate on their center axis of rotation. The sun roller 41 may cause the planetary balls 42 to roll by a rotating operation thereof or may be rotated by a rolling operation of the planetary balls 42.

The planetary balls 42 correspond to ball type pinions in the traction planetary gear mechanism and are radially disposed at approximately equal intervals to a radially outside portion (here, outer peripheral surface) of the sun roller 41 about the center axis of rotation X. Further, the planetary balls 42 are disposed between the radially outside portion of the sun roller 41 and radially inside portions (here, inner peripheral surfaces) of the first and second discs 44, 45 in contact with each other. The planetary balls 42 can transmit power between the sun roller 41 and the first disc 44 and the second disc 45 via the contact portions thereof. Since the planetary balls 42 are disposed as rolling members which rotate on their center axes of rotation between the sun roller 41 and the first and second discs 44, 45, although the planetary balls 42 are preferably a perfect spherical member, they may be formed to have an oval sectional shape as in, for example, a rugby ball.

Each planetary ball 42 is rotatably supported by a support shaft 42a passing through a center thereof. For example, the planetary ball 42 can relatively rotate (that is, can rotate on its center axis of rotation) with respect to the support shaft 42a via a bearing (not illustrated) interposed between the planetary ball 42 and an outer peripheral surface of the support shaft 42a. Accordingly, the planetary balls 42 can roll on the outer peripheral surface of the sun roller 41 about the support shafts 42a.

The support shafts 42a are disposed so that center axes thereof are located on a plane including the center axis of rotation X. As illustrated in FIG. 1, positions acting as references of the support shafts 42a are positions at which the center axes of the support shafts 42a are in parallel with, for example, the center axis of rotation X. The support shaft 42a can be swung (tilted) between the reference position and a position tilted from the reference position. The support shaft 42a is tilted in a plane including the center axis of the support shafts 42a and the center axis of rotation X. The tilt operation is performed by a shift mechanism attached to both ends of the support shaft 42a projecting from an outside peripheral curved surface of the planetary ball 42.

The shift mechanism tilts the planetary ball 42 together with the support shaft 42a by operating tilt arms 46 attached to both the ends of the support shaft 42a.

The tilt arms 46 are members for applying tilt force to the support shaft 42a and the planetary ball 42 and tilting a center axis of rotation of the planetary ball 42, that is, a center axis of the support shaft 42a. A pair of the tilt arms 46 is prepared to a support shaft 42a and a planetary ball 42. For example, the tilt arms 46 are molded and disposed so as to extend in a direction vertical with respect to the center axis of rotation X. Radially outside ends of the tilt arms 46 are attached to ends of the support shafts 42a, respectively. One of the pair of the tilt arms 46 moves radially outward and the other of the tilt arms 46 moves radially inward to thereby apply the tilt force to the support shaft 42a and the planetary ball 42. The tilt arms 46 are operably accommodated and held in grooves formed to disc portions 43a of the carriers 43. The grooves are aligned with a number of the tilt arms 46 and formed radially about the center axis of rotation X. Accordingly, the tilt arms 46, the support shafts 42a, and the planetary balls 42 rotate together with the carriers 43.

Although not shown, the shift mechanism is further provided with push members for moving the tilt arms 46 radially outward or radially inward and drive units for operating the push members. The tilt force is generated by moving the push members in the axis direction and applying push force of the push members to radially inside portions of the tilt arms 46. For example, the pair of the tilt arms 46 which support the support shafts 42a has radially inside extreme ends whose wall surfaces confronting with each other in the axis direction are tapered radially inward. Further, wall surfaces of both ends of the push members in the axis direction act as contact surfaces in contact with the extreme end taper surfaces of the tilt arms 46, and the contact surfaces are formed in a shape tapering radially outward. With the configuration, when the push force of the push members is applied to the tilt arms 46, since the tilt arms 46 are pushed upward radially outward, the support shafts 42a are tilted and the planetary balls 42 are tilted in association with the tilt operation of the support shafts 42a. As a tilt angle of the planetary ball 42, a reference position of FIG. 1 is set to, for example, 0 degree. The drive units are, for example, an electrically driven actuator such as an electrically driven motor or a hydraulic pressure actuator and are operated by being controlled by the control unit 1.

The carrier 43 is a rotating member which can rotate relatively to the sun roller 41 and the first and second discs 44, 45. The carrier 43 has a pair of disc potions 43a which uses the center axis of rotation X as a center axis. The disc potions 43a are disposed at positions where the disc potions 43a sandwich the planetary balls 42, the support shafts 42a and the tilt arms 46 in the axis direction. The disc potions 43a are integrated by not illustrated rod-like support portions. With the configuration, the carrier 43 holds the planetary balls 42, the support shafts 42a and the tilt arms 46 so as to prevent them from relatively moving in the axis direction with respect to the sun roller 41. Further, as the carrier 43 rotates, the carrier 43 rotates the planetary balls 42, the support shafts 42a and the tilt arms 46 about the center axis of rotation X by the grooves of the disc potions 43a described above.

The first and second discs 44, 45 are rotating members formed in an annular shape or a disc shape using the center axis of rotation X as a center axis, and are disposed to sandwich the planetary balls 42 in confrontation with each other in the axis direction. Specifically, the first and second discs 44, 45 have contact surfaces which come into contact with radially outside peripheral curved surfaces of the planetary balls 42. The contact surfaces have a concave arc surface having a curvature similar to that of the outside peripheral curved surface of the planetary ball 42. The contact surfaces are formed so that distances from the center axis of rotation X to the contact portions with the planetary balls 42 have the same length and contact angles of the first and second discs 44, 45 to the planetary balls 42 have the same angle. The contact angle is an angle from the reference to the contact portions in contact with the planetary balls 42. Here, a radial direction is used as the reference. The contact surfaces are in point contact or in line contact with the outer peripheral curved surfaces of the planetary balls 42. Note that a contact line in the line contact faces a direction orthogonal to a plane when the planetary balls 42 described above tilt. The contact surfaces are formed such that when axis-direction power toward the planetary balls 42 is applied to the first and second discs 44, 45, power is applied to the planetary balls 42 radially inward in an oblique direction.

In the power dividing mechanism 40, when the planetary balls 42 has the tilt angle of 0 degree, the first disc 44 and the second disc 45 rotate at the same number of rotations (at the same rotation speed). That is, at the time, a rotation ratio (ratio of the number of rotations) of the first disc 44 and the second disc 45 becomes 1. In contrast, when the planetary balls 42 are tilted from the reference position, distances from the center axes of the support shafts 42a to the contact portions in contact with the first disc 44 change as well as distances from the center axes of the support shafts 42a to the contact portions in contact with the first disc 44 change. Accordingly, any one of the first disc 44 or the second disc 45 rotates at a speed higher than when it is located at the reference position and the other of the first disc 44 or the second disc 45 rotates at a speed lower than when it is located at the reference position. For example, when the planetary balls 42 are tilted clockwise on a sheet of FIG. 1, the second disc 45 rotates at a speed lower than the first disc 44 (a speed is increased), whereas when the planetary balls 42 are tilted counterclockwise on the sheet of FIG. 1, the second disc 45 rotates at a speed higher than the first disc 44 (a speed is reduced). Accordingly, in the power dividing mechanism 40, the rotation ratio between the first disc 44 and the second disc 45 can be changed continuously by changing the tilt angle of the planetary balls 42.

The power dividing mechanism 40 is provided with push units (not illustrated) for pushing at least any one of the first or second disc 44, 45 to the planetary balls 42 and generating nip-pressure between the first and second discs 44, 45 and the planetary balls 42. The push units generate the nip-pressure between the first and second discs 44, 45 and the planetary balls 42 by generating power (push force) in the axis direction. The push force is set to a magnitude by which torque can be transmitted between the sun roller 41 and the first and second discs 44, 45 via the planetary balls 42. For example, the push units may be a drive source such as an electrically driven actuator and a hydraulic pressure actuator or may be a mechanism such as a torque cam for generating the push force as the first or second disc 44, 45 as a target for disposition rotates. In the power dividing mechanism 40, the nip-pressure is generated between the first and second discs 44, 45 and the planetary balls 42 by operating the push units so that the push units generate the push force, and thereby friction force is generated between the first and second discs 44, 45 and the planetary balls 42.

In the power dividing mechanism 40, as the sun roller 41 rotates, since the planetary balls 42 are rolled by the friction force, rotation torque generated by that the planetary balls 42 rotate on their axes is transmitted to the first and second discs 44, 45 and rotate the first and second discs 44, 45. At the time, the carrier 43 rotates about the center axis of rotation X together with the planetary balls 42, the support shafts 42a, and the tilt arms 46. In the power dividing mechanism 40, the rotation torque, which is generated by the planetary balls 42 which are caused to rotate on their axes by the rotation of the first disc 44, is transmitted to the sun roller 41 and the second disc 45 and rotates the sun roller 41 and the second disc 45. In the power dividing mechanism 40, the rotation torque, which is generated by the planetary balls 42 which are caused to rotate on their axes by the rotation of the second disc 45 is transmitted to the sun roller 41 and the first disc 44 and rotates the sun roller 41 and the first disc 44. Further, in the power dividing mechanism 40, since the planetary balls 42 rotate on their axes while revolving in association with the rotation of the carrier 43, rotation torque generated by that the planetary balls 42 rotate on their axes is transmitted to the sun roller 41 and the first and second discs 44, 45 and rotates the sun roller 41 and the first and second discs 44, 45.

In the first embodiment, the power dividing mechanism 40 is connected to the power sources (engine 10 and first and second motor/generators 20, 30) as described below.

First, the output shaft 11 of the engine 10 is coupled with the carrier 43 (second rotating element). The output shaft 11 rotates integrally with the carrier 43. Further, a rotating shaft 21 of the first motor/generator 20 is coupled with the sun roller 41 (first rotating element). The rotating shaft 21 rotates integrally with the sun roller 41. Further, a rotating shaft 31 of the second motor/generator 30 is coupled with the first disc 44 (third rotating element). The rotating shaft 31 rotates integrally with the first disc 44. In the drive system, the rotating shaft 31 of the second motor/generator 30 acts also as an output shaft on the system toward a drive wheel side.

Figure 2:
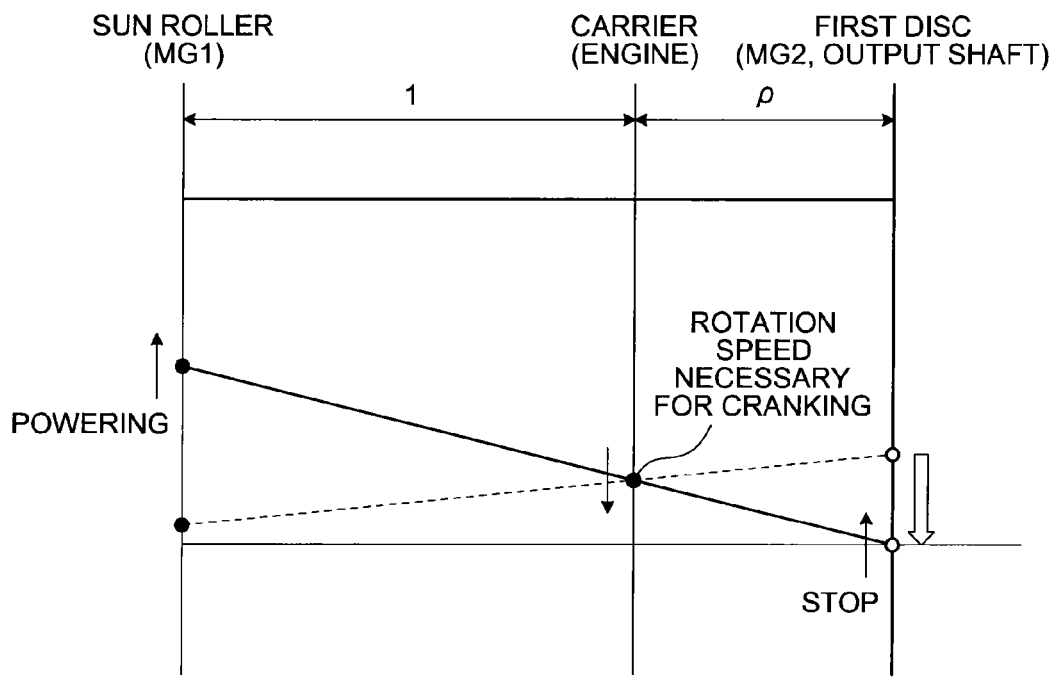
FIG. 2 is an alignment chart of the drive system of the first embodiment.

The control unit 1 controls the drive system configured as described above using alignment charts which show rotation speeds (the number of rotations) of the first to third rotating elements (the first disc 44 corresponds to the sun roller 41, the carrier 43, and a ring gear) by straight lines. An alignment chart illustrated in FIG. 2 shows the rotation speeds of the sun roller 41, the carrier 43, and the first disc 44 by straight lines by sequentially disposing coordinate axes in the order of the sun roller 41, the carrier 43, and the first disc 44. In the alignment charts, vertical axes, that is, the sun roller axis, the carrier axis, and the first disc axis disposed sequentially from left show the rotation speeds of the rotating elements. Portions of the vertical axes above a horizontal axis show a positive rotation and portions of the vertical axes below the horizontal axis shows a negative rotation. Further, the horizontal axis shows a relation of ratios (rotation ratios) of the rotation speeds of the sun roller 41, the carrier 43, and the first disc 44. In the alignment charts, the carrier axis is determined at a position where the carrier axis internally divides the sun roller axis and the first disc axis in a relation of 1:$\rho$. The $\rho$ is a value (rotation ratio) obtained by dividing an absolute value of a relative rotation speed of the first disc 44 to the carrier 43 by an absolute value of a relative rotation speed of the sun roller 41 to the carrier 43, and is so-called a planetary gear ratio.

The control unit 1 performs a start control of the engine 10 making use of the alignment charts. In the drive system, when the engine 10 is started, a rotation of the first motor/generator 20 (MG 1) is transmitted to the output shaft 11 and the engine 10 is cranked. At the time, on the alignment charts, the rotation speed (number of rotations) of the carrier 43 is set at least higher than a rotation speed necessary for cranking (number of rotations necessary for cranking) as well as a rotation speed of the first disc 44 is reduced. As a result, since the rotation speed of the sun roller 41 increases on the alignment charts, torque of the first motor/generator 20 necessary for cranking can be reduced. When, for example, FIG. 2 is exemplified as an example, a state of a broken line is shifted to a state of a solid line by reducing the rotation speed of the first disc 44 than that at the time while keeping the rotation speed necessary for cranking (here, the rotating speed is reduced until the first disc 44 stops), and thereby the rotation speed of the sun roller 41 is increased. With the operation, since a rotation speed of the first motor/generator 20 is increased as compared with the state of the broken line and the rotation speed of the engine 10 can be increased up to the rotation speed necessary for cranking by a small amount of motor torque, the torque necessary for cranking the first motor/generator 20 can be reduced. The rotation speed necessary for cranking is a rotation speed necessary to start the engine 10 at which the fuel injection and the like can be performed.

Figure 3:
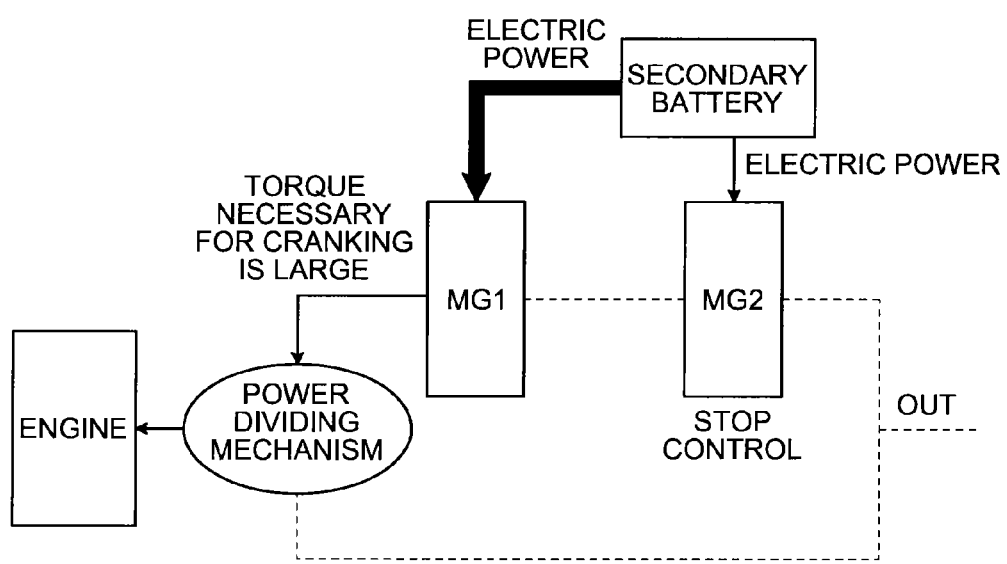
FIG. 3 is a view illustrating a power flow of the drive system in a state illustrated in FIG. 2.
Figure 4:
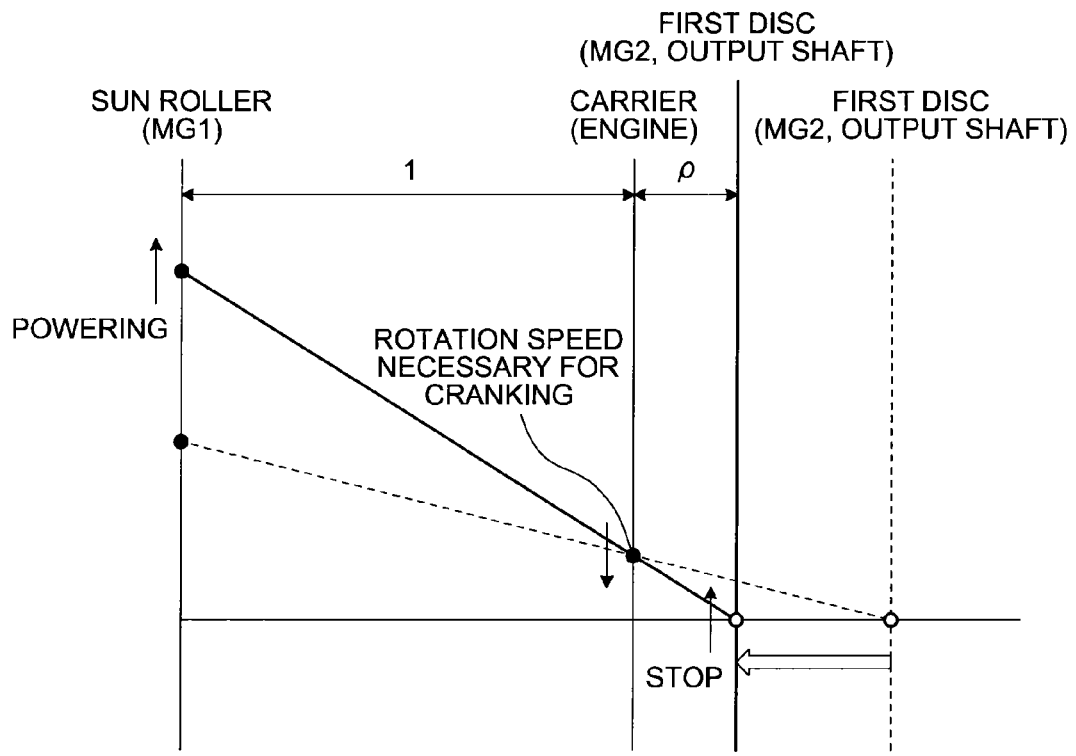
FIG. 4 is an alignment chart of the drive system of the first embodiment and is a view illustrating a state when a cranking control of the first embodiment is executed.

The cranking in a state that the planetary gear ratio $\rho$ is fixed is similar to a cranking operation mode performed by a power dividing mechanism composed of a conventional planetary gear mechanism by which a planetary gear ratio $\rho$ cannot be changed. In the state that the planetary gear ratio $\rho$ is fixed, since an upper limit of the rotation speed of the sun roller 41 is restricted by the rotation speed necessary for cranking in the carrier 43 and by the rotation speed (0 at the lowest rotation speed) of the first disc 44, an upper limit of the rotation speed of the sun roller 41 is low and thus a still larger amount of torque necessary for cranking must be generated by the first motor/generator 20 to increase the rotation speed of the carrier 43 to the rotation speed necessary for cranking. Although a power flow in the drive system at the time is illustrated in FIG. 3, to increase motor torque (motor powering torque) of the first motor/generator 20 to the torque necessary for cranking, a lot of electric power must be supplied from the secondary battery 51 to the first motor/generator 20.

Note that, at the time, to stop the first disc 44, a stop control by supplying electric power from the secondary battery 51 and stopping a rotation of the rotating shaft 31 of the second motor/generator 30 is performed. In the stop control, electric power having a magnitude according to the rotation speed of the sun roller 41 is supplied to the second motor/generator 30 and the second motor/generator 30 is caused to generate motor torque capable of stopping the rotating shaft 31 (resistance torque having a magnitude for canceling torque applied to the first disc 44 as the sun roller 41 rotates). Since a higher rotation speed of the sun roller 41 requires a larger amount of resistance torque, an amount of the electric power to be supplied increases as the rotation speed of the sun roller 41 becomes higher. To explain the resistance torque in a different manner, the resistance torque receives reaction force from a vehicle (drive wheel) side.

Since a large amount of the torque necessary for cranking requires a capacity with correspondence with amount of the torque, which increases the first motor/generator 20 in size and weight. In general, an increase of a capacity of the motor/generator brings an increase of a cost thereof. Further, to supply a large amount of electric power, an electric circuit which withstands the large amount of electric power is necessary, from which a cost is also increased.

To cope with the problem, in the first embodiment, when the start control of the engine 10 is performed, the planetary gear ratio $\rho$ is controlled so that the rotation speed of the sun roller 41 coupled with the first motor/generator 20 is increased on an alignment chart. When, for example, the start control of the engine 10 is performed, the planetary gear ratio $\rho$ is made smaller than a predetermined value on an alignment chart illustrated in FIG. 4 to thereby increase the rotation speed of the sun roller 41. On the alignment chart at the time, the rotation speed of the carrier 43 is set to a speed at which at least the rotation speed necessary for cranking is kept as well as the rotation speed of the first disc 44 is reduced than the rotation speed of the carrier 43. Accordingly, the rotation speed of the sun roller 41 is increased than when the planetary gear ratio $\rho$ is fixed (broken line) by controlling the planetary gear ratio $\rho$. When a request value requested by the planetary gear ratio $\rho$ is determined, the control unit 1 controls the tilt angle of the planetary balls 42 so that the request value is satisfied. Note that, the rotation speed of the first disc 44 is reduced up to 0 at which the rotation speed is maximized (that is, the first disc 44 stops).

Figure 5:
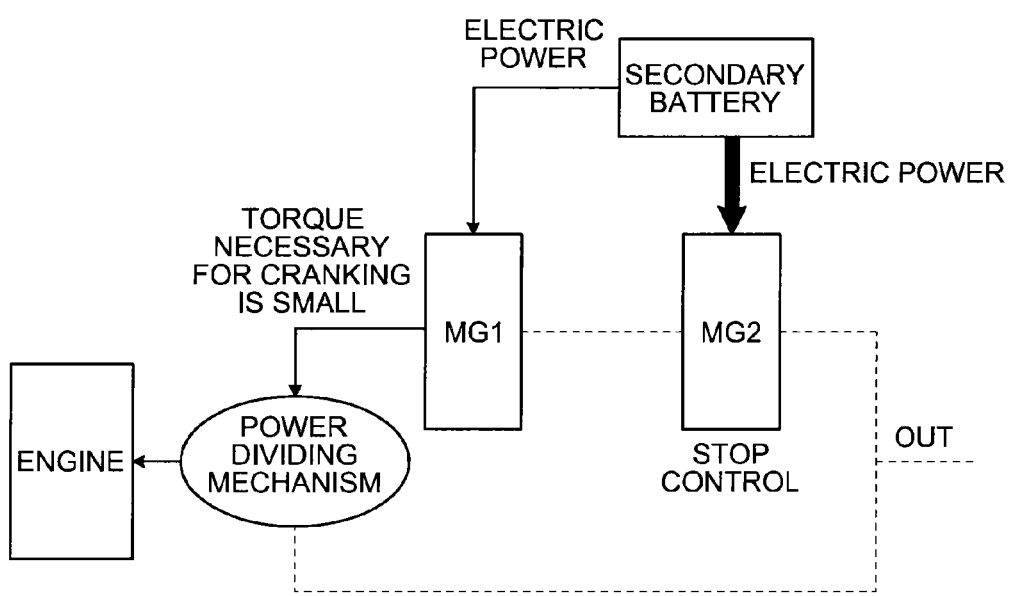
FIG. 5 is a view illustrating a power flow of the drive system in a state illustrated in FIG. 4.

Accordingly, as illustrated in a power flow of FIG. 5, since the torque necessary for cranking which must be generated by the first motor/generator 20 can be reduced, the engine 10 can increase a rotation speed of the output shaft 11 up to the rotation speed necessary for cranking by a small amount of motor torque of the first motor/generator 20. Accordingly, the first motor/generator 20 can reduce the size and the weight by reducing its capacity and further can also reduce the cost. The reduction in size of the first motor/generator 20 also leads to a reduction in size of drive system. Further, since the amount of electric power supplied to the first motor/generator 20 can be suppressed low, the cost of the electric circuit can be reduced and an electric power consumption of the secondary battery 51 can be suppressed. As a result, in the first embodiment, since it can be avoided that the capacity of the first motor/generator 20 becomes insufficient and the amount of the electric power to be supplied becomes insufficient and thus the engine 10 can be certainly cranked, a starting property of the engine 10 can be improved. Further, in the first embodiment, since no dedicated parts are necessary to start the engine, the engine can be started at a low cost as well as the drive system can be made more compact. Furthermore, in the first embodiment, the traction planetary gear mechanism as described above is used to the power dividing mechanism 40 capable of changing the planetary gear ratio $\rho$, which contributes to a reduction in size and cost.

The predetermined value described above may be determined based on a physical constitution (capacity) and a request value of cost of the first motor/generator 20 to be mounted and a request value of cost of the electric circuit. When, for example, it is desired to reduce the capacity of the first motor/generator 20, the rotation speed of the sun roller 41 is set to a rotation speed at which torque necessary for cranking, which has a magnitude provided with an upper limit corresponding to the desired capacity or with an allowance can be generated, is determined on an alignment chart, and a planetary gear ratio, which is shown by a straight line connecting the rotation speed to the rotation speed necessary for cranking in the carrier 43, is set to a predetermined value.

Figure 6:
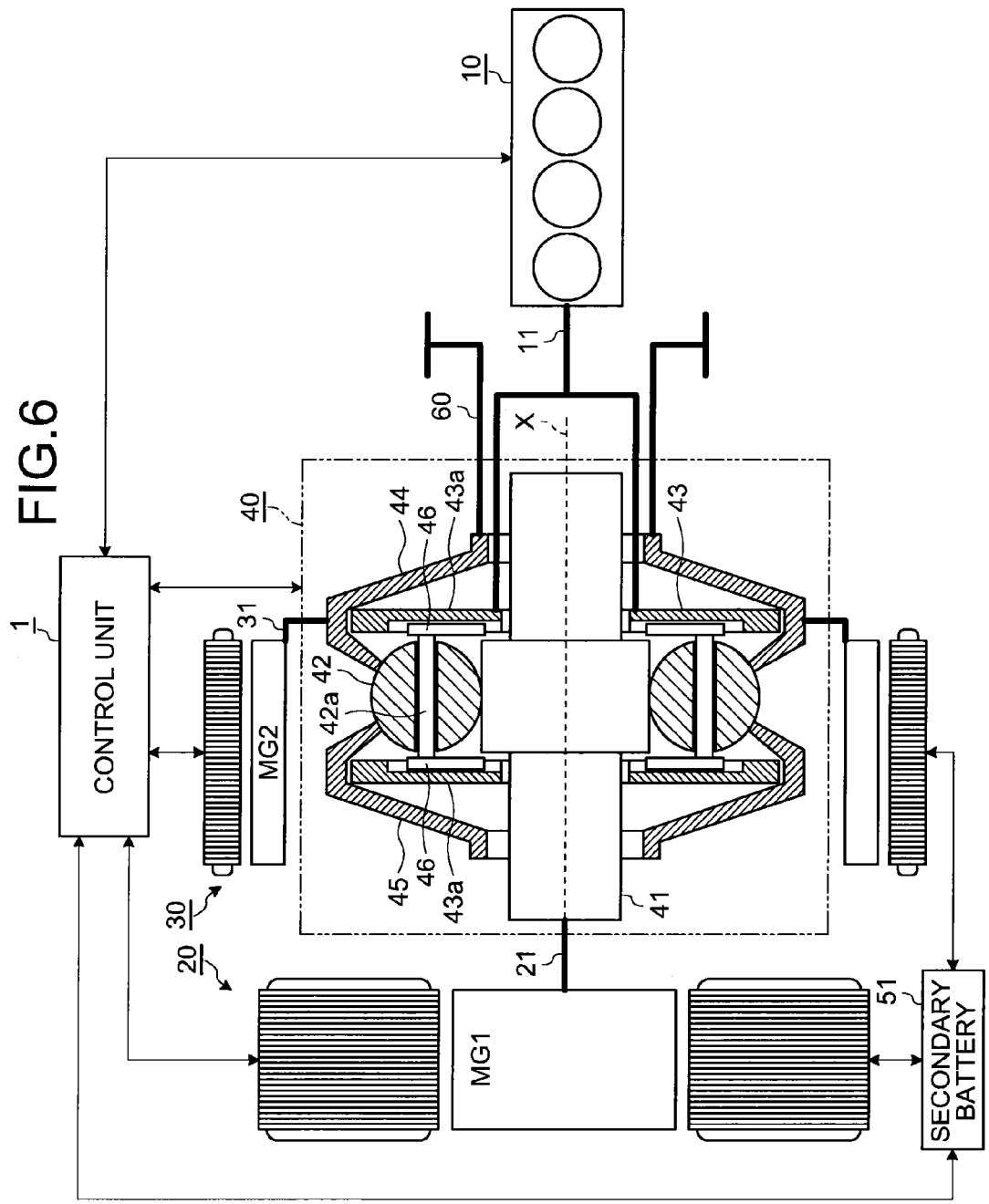
FIG. 6 is a view illustrating another configuration of the drive system of the first embodiment.
Figure 7:
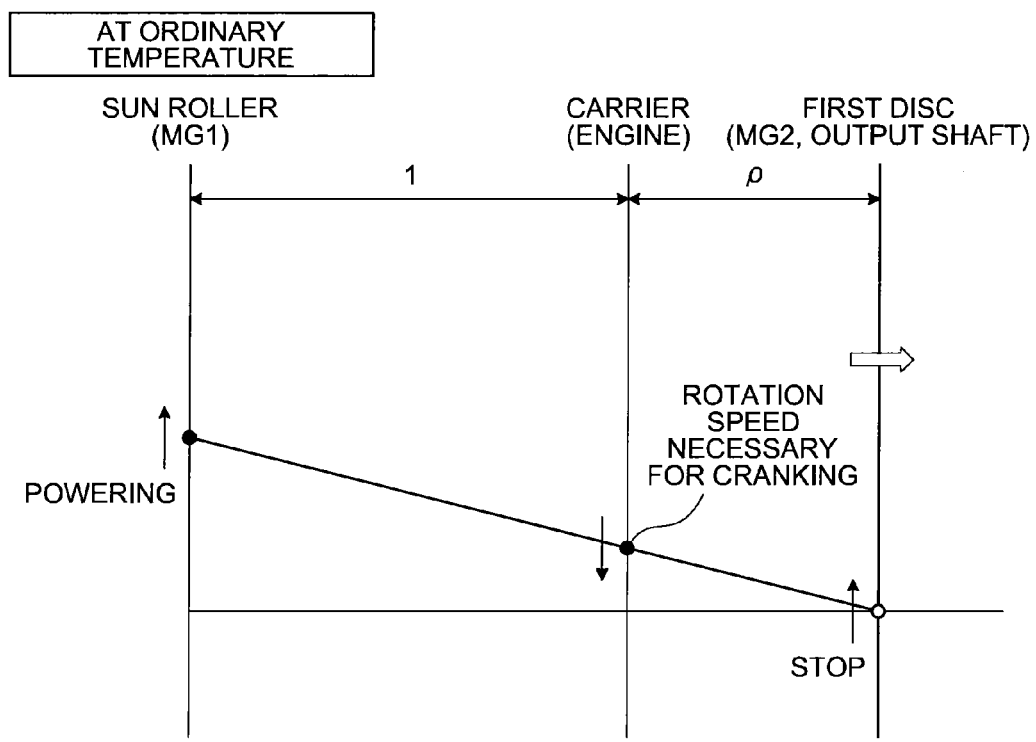
FIG. 7 is an alignment chart of a drive system of a second embodiment and is a view illustrating a state when a secondary battery is at an ordinary temperature.

Incidentally, the first embodiment can be applied not only to the drive system composed of the configuration described above but also to a drive system having a mode of FIG. 6 shown below. The drive system illustrated in FIG. 6 is configured such that a second motor/generator 30 is disposed to the drive system illustrated in FIG. 1 so as to cover an outer peripheral side of an approximately cylindrical power dividing mechanism 40. In other words, in the drive system, the power dividing mechanism 40 is disposed inside of a rotor of the second motor/generator 30 coaxially with a center axis of rotation X of the rotor.

Also in the drive system, a rotating shaft 31 of the second motor/generator 30 is coupled with a first disc 44 so as to rotate integrally therewith. In contrast, in the drive system of FIG. 1, although the rotating shaft 31 is used as the output shaft of the drive system facing the drive wheel side, in the drive system, an output shaft 60 thereof is provided independently of the rotating shaft 31 and coupled with the first disc 44 so as to rotate integrally therewith.

The drive system can also achieve an operation and a working effect similar to those of the drive system of FIG. 1. In the drive system, since the second motor/generator 30 is disposed so as to cover the outer peripheral side of the power dividing mechanism 40, the second motor/generator 30 having a low-rotation/high-torque specification as compared with the first motor/generator 20 can be configured compact, and thus the drive system can achieve a more reduction in size, weight, and cost than the drive system of FIG. 1.

Further, as described above, in the drive systems of FIG. 1 and FIG. 6, the reaction force from the vehicle (drive wheel) side due to engine torque and the like is received by the stop control of the second motor/generator 30. With the operation, drive force is prevented from being generated by the drive wheels due to the engine start control. However, since the stop control requires electric power of the secondary battery 51, a configuration which does not need to execute the stop control may be arranged by causing a vehicle stop device as described below to receive the reaction force. For example, a wheel braking device capable of adjusting brake force by a control performed by the control unit 1 can be considered as the vehicle stop device. In the case, the control unit 1 controls an actuator of the braking device and causes a wheel to generate brake force only capable of receiving the reaction force. Further, a so-called parking device for preventing a forward/backward travel of a vehicle in park can be used as the vehicle stop device. When, for example, a shift lever is located at an operation position (shift position P) of the parking device when the vehicle stops, the stop control of the second motor/generator 30 is not necessary. Further, even if the shift lever is not located at the operation position, the stop control of the second motor/generator 30 becomes unnecessary by causing the control unit 1 to operate the parking device. As described above, since an electric power consumption of the secondary battery 51 necessary to the stop control can be suppressed by making the stop control of the second motor/generator 30 unnecessary, fuel consumption can be improved.

Further, in the power dividing mechanism 40 of the drive system exemplified in the first embodiment, the sun roller 41 is applied as the first rotating element with which the first motor/generator 20 is coupled, and the first disc 44 is applied as the third rotating element with which the rotating shaft 31 of the second motor/generator 30 (which is used also as the output shaft on the system toward the drive wheel side) is coupled. Accordingly, in the exemplification, the planetary gear ratio ρ is made smaller than the predetermined value on the alignment chart illustrated in FIG. 4 to increase the rotation speed of the sun roller 41 (that is, the first motor/generator 20) when the start control of the engine 10 is performed. In contrast, the power dividing mechanism may use the first disc 44 as the first rotating element as well as may use the sun roller 41 as the third rotating element. In the case, the planetary gear ratio ρa is made larger than the predetermined value on the alignment chart to increase the rotation speed of the first motor/generator 20 when the start control of the engine 10 is performed. Here, the planetary gear ratio ρa is a value (rotation ratio) obtained by dividing an absolute value of a relative rotation speed of the first disc 44 to the carrier 43 by an absolute value of a relative rotation speed of the sun roller 41 to the carrier 43. In the alignment chart of the case, "ρ" is read otherwise to "ρa", "the MG 1" and "the MG 2, the output shaft" are read otherwise in, for example, the alignment chart illustrated in FIG. 4. In the alignment chart, the rotation speed of the carrier 43 is set so that at least the rotation speed necessary for cranking is kept as well as the rotation speed of the sun roller 41 is reduced than the rotation speed of the carrier 43. Accordingly, the rotation speed of the first disc 44 is increased as the planetary gear ratio ρ is controlled. Note that the rotation speed of the sun roller 41 is reduced until the sun roller 41 stops at the maximum.

Second Embodiment

A second embodiment of the engine start control device of the hybrid vehicle according to the present invention will be explained based on FIGS. 7 to 10.

The engine start control device of the second embodiment is provided with a cranking operation control function described below together with/or independently of a cranking operation control function similar to that of the engine start control device of the first embodiment described above. A control target of the engine start control device of the second embodiment is the drive system of FIG. 1 or FIG. 6 exemplified in the first embodiment. The cranking operation control function in the second embodiment will be described below in detail.

A performance of a secondary battery 51 may be sufficiently exhibited or may be deteriorated depending on a usage environment in which the secondary battery 51 is used. That is, although the secondary battery 51 causes no problem when it is used in an ordinary temperature region, when the secondary battery 51 is used in a low temperature region and a high temperature region, its performance may be deteriorated. The temperature region is different depending on respective secondary batteries 51 and is determined as a specification when the batteries 51 are designed. Since the deterioration of performance of the secondary battery 51 results in a drop of an output of the secondary battery 51 and an amount of electric power to be supplied to a first motor/generator 20 becomes insufficient, it becomes difficult to increase a rotation speed of a carrier 43 (an output shaft 11 of an engine 10) to a rotation speed necessary for cranking, and thus a starting property of the engine 10 may be lowered. In contrast, at the time of ordinary temperature at which the performance of the secondary battery 51 can be exhibited without problem, although a necessary and sufficient amount of electric power to be supplied can be obtained, when a rotation speed of the first motor/generator 20 excessively increases, silence may be impaired at the time the engine starts.

Figure 8:
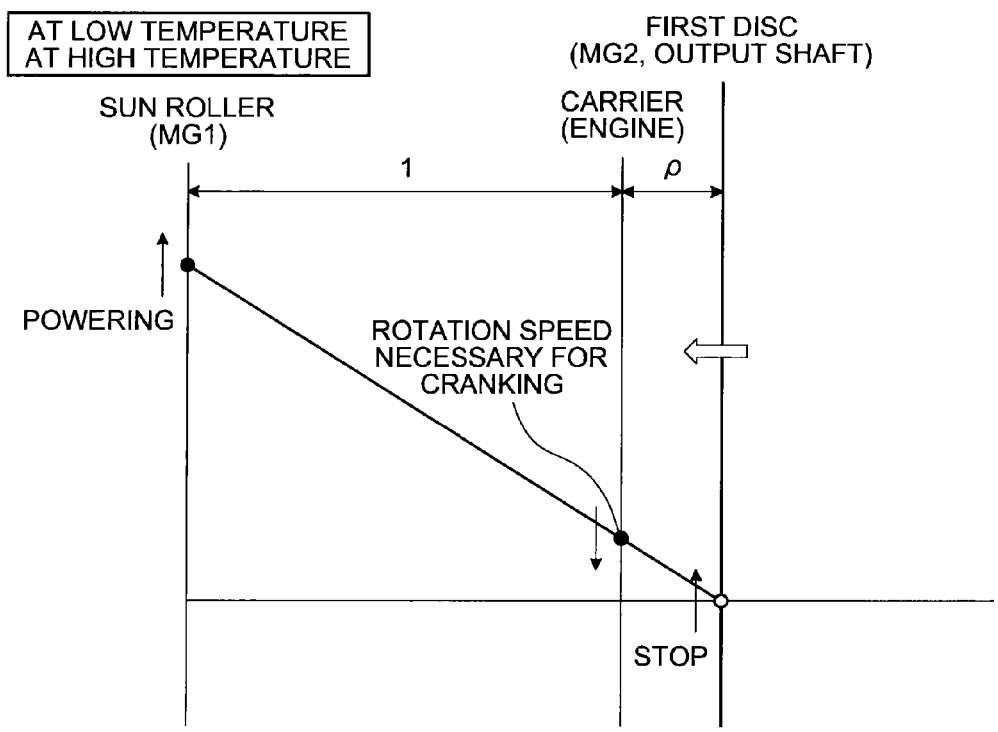
FIG. 8 is an alignment chart of the drive system of the second embodiment and is a view illustrating a state when the secondary battery is at a low temperature or a high temperature.

To cope with the problem, in the second embodiment, a control unit 1 is configured such that a planetary gear ratio ρ is increased more when the secondary battery 51 is at the ordinary temperature than when the secondary battery 51 is at the low temperature and the high temperature (FIG. 7), whereas the planetary gear ratio ρ is reduced more when the secondary battery 51 is at the low temperature and the high the temperature than when the secondary battery 51 is at the ordinary temperature (FIG. 8). The planetary gear ratio ρ is preferably set using a map shown below.

Figure 9:
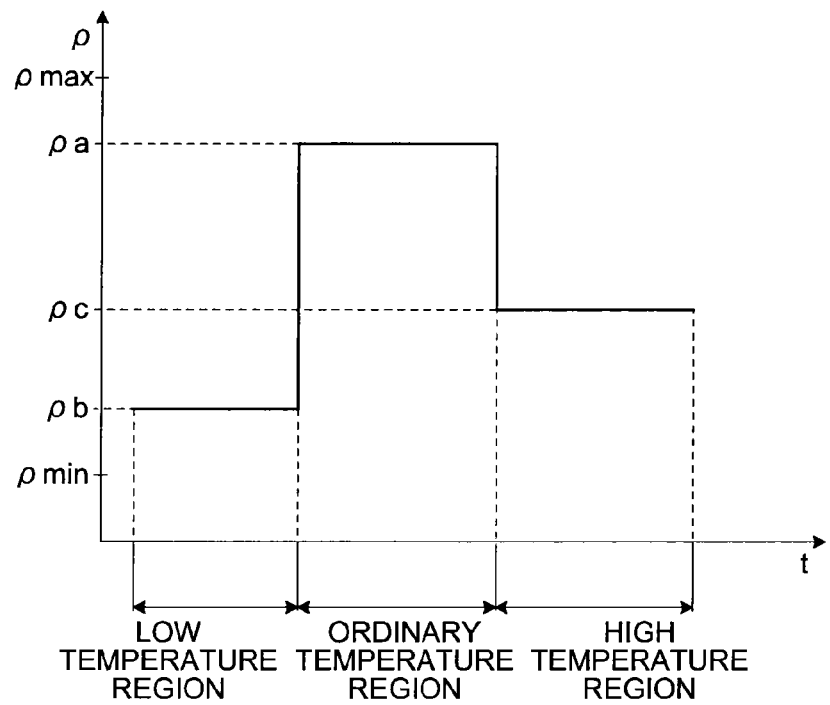
FIG. 9 is a view illustrating an example of a map of a planetary gear ratio according to a temperature of the secondary battery.

For example, as shown in a map of FIG. 9, when a temperature t of the secondary battery 51 is in the ordinary temperature region, the planetary gear ratio ρ is set to become a predetermined value ρa, when the temperature t of the secondary battery 51 is in the low temperature region, the planetary gear ratio ρ is set to become a predetermined value ρb, and when the temperature t of the secondary battery 51 is in the high temperature region, the planetary gear ratio ρ is set to become a predetermined value ρc (ρmax≥ρa>ρc>ρb≥ρmin).

The term "ρmax" is a maximum value of the planetary gear ratio which can be changed, and "ρmin" is a minimum value of the planetary gear ratio which can be changed. Values of the predetermined values ρa, ρb, ρc are preferably determined by an experiment and a simulation.

The predetermined value ρa is set to any value of the planetary gear ratios ρ by which the silence at the time the engine 10 starts can be kept within a request value in the ordinary temperature region in which the performance of the secondary battery 51 can be sufficiently exhibited. As a result, since the rotation speed of the sun roller 41 can be reduced in the ordinary temperature region, an engine rotation number can be gently increased at the time of cranking, and thereby the silence can be improved at the time the engine starts. Further, the predetermined value ρa may be set to a minimum value or to a value near to the minimum value in the planetary gear ratios ρ by which the silence can be kept within the request value in the ordinary temperature region at the time, for example, the engine 10 starts. When the predetermined value ρa is set as described above, since the rotation speed of the sun roller 41 is not excessively increased in the ordinary temperature region, the silence is improved at the time the engine starts. Further, since the rotation speed of the sun roller 41 at the time of cranking is set to a high speed side within a range in which the silence can be kept, the first motor/generator 20 can be reduced in size and weight as far as possible, by which the drive system can be made compact and a cost of an electric circuit can be reduced.

In the low temperature region or in the high temperature region in which a deterioration of performance of the secondary battery 51 is admitted, the predetermined value ρb or ρc is set to any value of the planetary gear ratios ρ at which the rotation speed of the sun roller 41 (the first motor/generator 20) can be increased in a degree by which insufficient motor torque (motor powering torque) of the first motor/generator 20 due to a drop of output of the secondary battery 51 can be compensated. As a result, in the low temperature region and in the high temperature region, a rotation speed of the carrier 43 (the output shaft 11 of the engine 10) can be increased up to the rotation speed necessary for cranking even by a small amount of motor torque of the first motor/generator 20, and thereby the engine 10 can be started. Note that the predetermined value ρb is smaller than the predetermined value ρc. This is because the performance of the secondary battery 51 is more likely to be deteriorated in the low temperature region than in the high temperature region.

As described above, according to the map of the FIG. 9, the silence at the time the engine starts is improved in the ordinary temperature region as well as the starting property of the engine 10 is in the low temperature region and the high temperature region improved.

Figure 10:
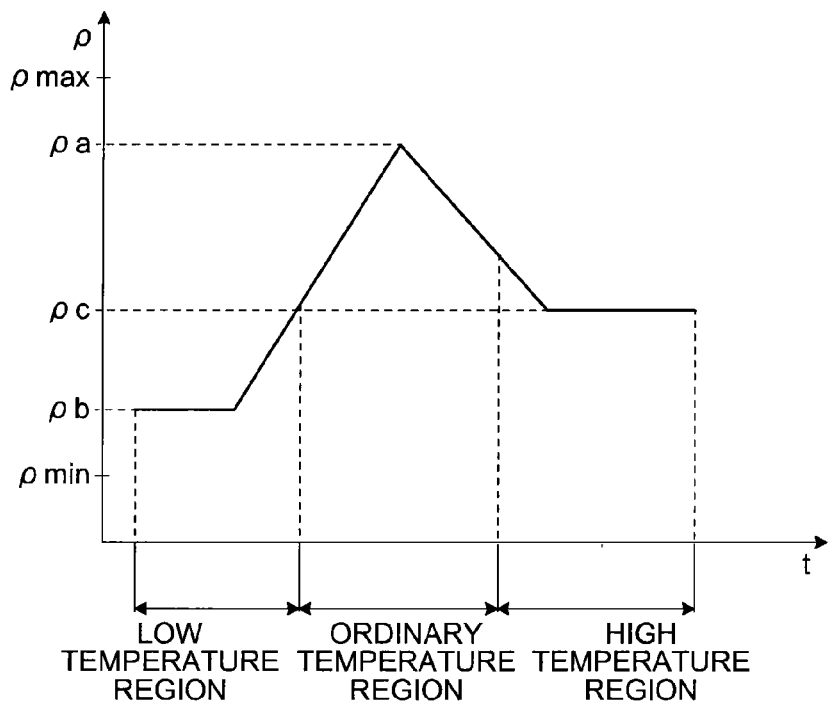
FIG. 10 is a view illustrating another example of the map of the planetary gear ratio according to the temperature of the secondary battery.

When strictly examined, the performance of the secondary battery 51 is deteriorated even in the ordinary temperature region as the ordinary temperature region approaches the low temperature region and the high temperature region. Likewise, the performance of the secondary battery 51 in the low temperature region and the high temperature is improved as the low temperature region and the high temperature are nearer to the ordinary temperature region. Accordingly, the planetary gear ratio ρ may be set by a map as shown in FIG. 10. Here, a temperature at which a best performance is exhibited is called the ordinary temperature. Further, for the convenience of explanation, the predetermined values ρa, ρb, ρc (ρmax≥ρa>ρc>ρb≥ρmin) of FIG. 9 are used.

In the map of FIG. 10, the planetary gear ratio ρ is set to the predetermined value ρa at the time of ordinary temperature. Further, in the map, during a time in which the temperature t of the secondary battery 51 reaches from the ordinary temperature to a certain temperature of the low temperature region, the planetary gear ratio ρ is gradually reduced from the predetermined value ρa to the predetermined value ρb as the temperature t decreases. Even if the certain temperature is in, for example, the low temperature region, the certain temperature is set to a temperature at which the starting property of the engine 10 can be secured without reducing the planetary gear ratio ρ to the predetermined value ρb. If a temperature at which the starting property can be secured does not exist in the low temperature region, it may be set, for example, a boundary temperature between the low temperature region and the ordinary temperature region as the certain temperature. Further, in the map, during a time in which the temperature t of the secondary battery 51 reaches from the ordinary temperature to a certain temperature of the high temperature region, the planetary gear ratio ρ is gradually reduced from the predetermined value ρa to the predetermined value ρc as the temperature t increases. Even if the certain temperature is in, for example, the high temperature region, the certain temperature is set to a temperature at which the starting property of the engine 10 can be secured without reducing the planetary gear ratio ρ to the predetermined value ρb. If a temperature at which the starting property can be secured does not exist in the high temperature region, it may be set, for example, a boundary temperature between the low temperature region and the ordinary temperature region as the certain temperature.

The silence can be improved at the time the engine starts on the ordinary temperature side and the starting property of the engine 10 on the low temperature side and the high temperature side can be improved even using the map of FIG. 10.

Third Embodiment

A third embodiment of the engine start control device of the hybrid vehicle according to the present invention will be explained based on FIGS. 11 to 13.

Figure 11:
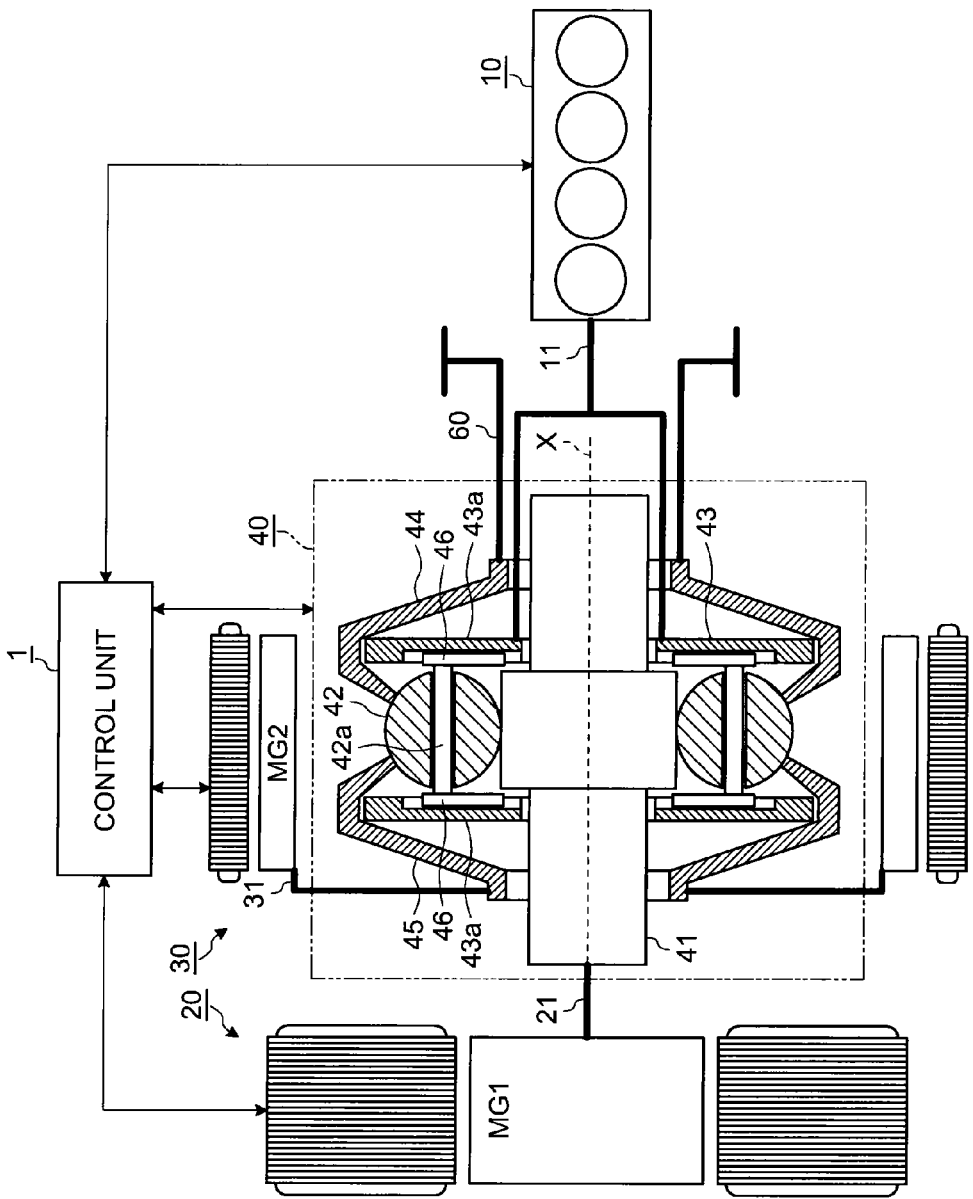
FIG. 11 is a view illustrating an engine start control device of a hybrid vehicle according to the present invention and a drive system of a third embodiment.

The engine start control device of the third embodiment uses a drive system illustrated in FIG. 11 as a control target. The drive system is configured such that, in the drive system illustrated in FIG. 6 of the first embodiment described above, the rotating shaft 31 of the second motor/generator 30 is coupled with the second disc 45 in place of the first disc 44. The rotating shaft 31 is rotated integrally with the second disc 45. Accordingly, the drive system of the third embodiment can achieve an effect of a reduction in size likewise the drive system illustrated in FIG. 6.

Figure 12:
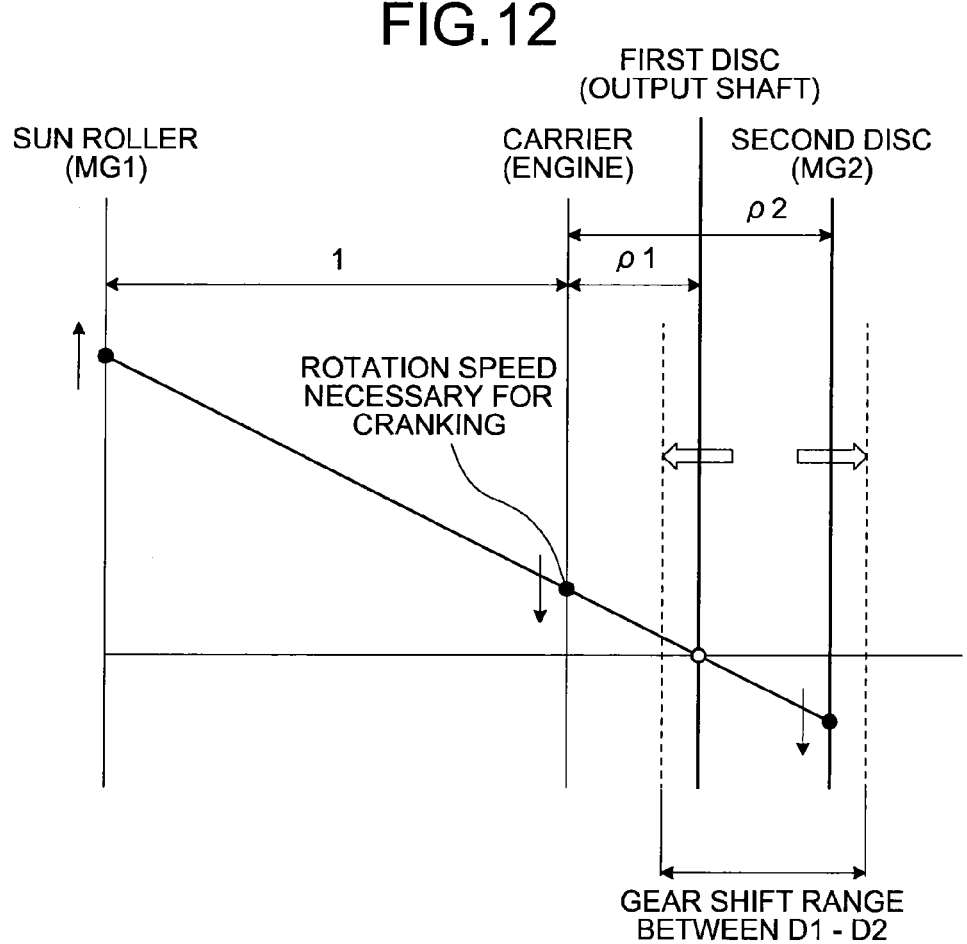
FIG. 12 is an alignment chart of the drive system of the third embodiment and is a view illustrating a state when a cranking control of the third embodiment is executed.

The drive system is controlled by a control unit 1 using an alignment chart of FIG. 12. The alignment chart disposes coordinate axes in the order of a sun roller 41 (first rotating element), the carrier 43 (second rotating element), the first disc 44 (third rotating element), and the second disc 45 (fourth rotating element) and shows rotation speeds thereof by a straight line. In the alignment chart, vertical axes show rotation speeds of the rotating elements and are a sun roller axis, a carrier axis, a first disc axis, and a second disc axis sequentially from the left. Further, horizontal axes show a relation of rotation speed ratios (rotation ratios) of the sun roller 41, the carrier 43, the first disc 44, and the second disc 45. In the alignment chart, the carrier axis is determined at a position which internally divides between the sun roller axis and the first disc axis in a relation of 1:ρ1 as well as between the sun roller axis and the second disc axis in a relation of 1:ρ2. The first planetary gear ratio ρ1 is a value (rotation ratio) obtained by dividing an absolute value of a relative rotation speed of the first disc 44 to the carrier 43 by an absolute value of a relative rotation speed of the sun roller 41 to the carrier 43. Further, the second planetary gear ratio ρ2 is a value (rotation ratio) obtained by dividing an absolute value of a relative rotation speed of the second disc 45 to the carrier 43 by an absolute value of a relative rotation speed of the sun roller 41 to the carrier 43. A relation of the first planetary gear ratio ρ1 and the second planetary gear ratio ρ2 is determined by a tilt angle of the planetary balls 42.

In the drive system configured as described above, when a start of the engine 10 is controlled, the first and second planetary gear ratios ρ1, ρ2 are controlled so that a rotation speed of the sun roller 41 coupled with the first motor/generator 20 is increased on the alignment chart. When, for example, the start of the engine 10 is controlled, the first planetary gear ratio ρ1 is made smaller than a first predetermined value as well as the second planetary gear ratio ρ2 is made larger than a second predetermined value on the alignment chart illustrated in FIG. 12 so that the rotation speed of the sun roller 41 is increased. In the alignment chart at the time, a rotation speed of the carrier 43 is set so that at least a rotation speed necessary for cranking is kept as well as a rotation speed of the first disc 44 is reduced than the rotation speed of the carrier 43. Accordingly, the rotation speed of the sun roller 41 is increased by controlling the first and second planetary gear ratios ρ1, ρ2. When request values of the first planetary gear ratio ρ1 and the second planetary gear ratio ρ2 are determined, the control unit 1 controls the tilt angle of the planetary balls 42 so that the request values are satisfied. Note that, here, the rotation speed of the first disc 44 is reduced to 0 at which the rotation speed is maximized (that is, until the first disc 44 stops).

The first planetary gear ratio ρ1 and the second planetary gear ratio ρ2 are determined so as to fall within a width of a range of a rotation ratio between the first disc 44 (D1) and the second disc 45 (D2) on the alignment chart (that is, transmission range). The range of the rotation ratio is determined by a specification of the power dividing mechanism 40. Further, when one of the first planetary gear ratio ρ1 and the second planetary gear ratio ρ2 is determined, the other of them is inevitably determined. Accordingly, when, for example, an emphasis is mainly placed on a reduction of a capacity of the first motor/generator 20, the first planetary gear ratio ρ1 may be determined, and further when an emphasis is mainly placed on an output amount of motor torque of the second motor/generator 30, the second planetary gear ratio ρ2 may be determined. A first predetermined value when the first planetary gear ratio ρ1 is determined may be determined likewise the predetermined value shown in the first embodiment. For example, the rotation speed of the sun roller 41 may be set to a rotation speed, at which a torque load necessary for cranking having a magnitude provided with an upper limit corresponding to a capacity of the first motor/generator 20 to be determined or an allowance (strictly, it is preferable to take a torque load necessary for cranking of the second motor/generator 30 into consideration) can be generated, on an alignment chart and a planetary gear ratio shown by a straight line which connects the rotation speed to a rotation speed necessary for cranking in the carrier 43 may be set to the first predetermined value. Further, as to a second predetermined value when the second planetary gear ratio ρ2 is determined, it is preferable to determine the rotation speed of the second disc 45 to a rotation speed which can generate a torque load necessary for cranking having a magnitude which can be output or is desired to be output under a horizontal axis and to set a planetary gear ratio shown by a straight line which connects the rotation speed to the rotation speed necessary for cranking in the carrier 43 to the second predetermined value.

Figure 13:
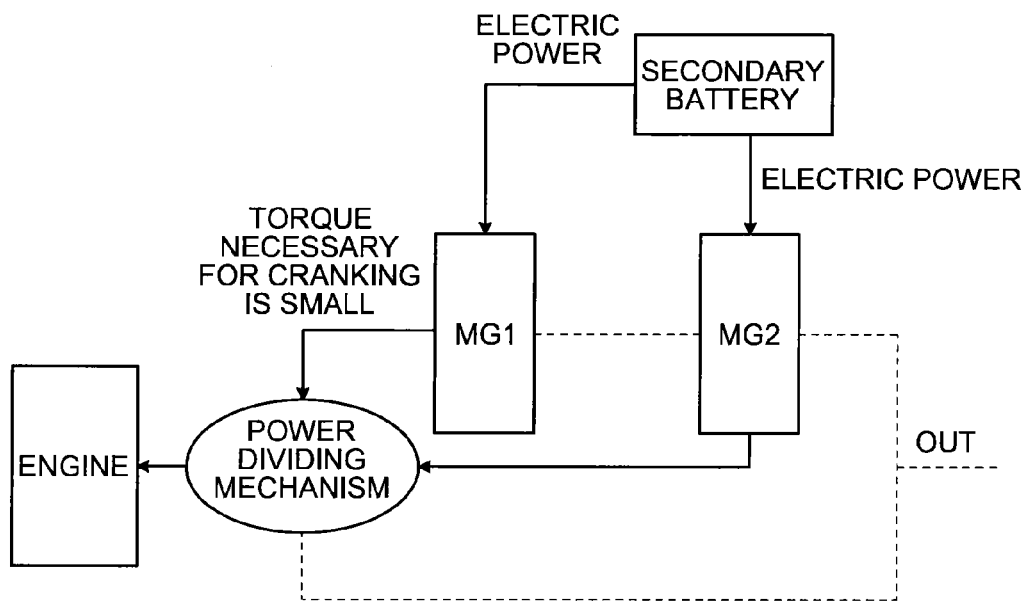
FIG. 13 is a view illustrating a power flow of the drive system in a state illustrated in FIG. 12.

In the second embodiment, as shown in a power flow of FIG. 13, the first motor/generator 20 and the second motor/generator 30 partly satisfy the torque necessary for cranking, respectively. That is, in the second embodiment, at the time of engine start control, cranking of the engine 10 can be controlled using the motor torque of the second motor/generator 30 (torque load of the second motor/generator 30 necessary for cranking). Further, the torque load necessary for cranking which must be generated by the first motor/generator 20 can not only be reduced by a reason similar to the first embodiment but also more reduced because the motor torque of the second motor/generator 30 can be also used. Accordingly, the first motor/generator 20 can be more reduced in size, weight, and cost than the first embodiment, by which the drive system can be further reduced in size and weight, and a cost of an electric circuit can be further reduced. Thus, in the second embodiment, the starting property of the engine 10 can be further improved.

When the control unit 1 performs the cranking control, it is preferable to cause the control unit 1 to control the drive system so that a relation of the first and second motor/generators 20, 30 satisfy the following expression 1. In the expression 1, "Tmg1" shows motor torque of the first motor/generator 20, and "Tmg2" shows motor torque of the second motor/generator 30. Further, "Tes" shows a magnitude of engine torque necessary to start the engine 10.

$$Tmg1*(1+\rho1)+Tmg2*(\rho2-\rho1)=Tes*\rho1 \tag{1}$$

In the second embodiment, reaction force from a vehicle (drive wheel) side due to engine torque and the like is not applied to the first disc 44 (first disc axis) coupled with an output shaft 60 toward a drive wheel side by satisfying the relation. That is, in the second embodiment, since no torque is transmitted to drive wheels at the time the engine starts, a generation of drive force in the drive wheels can be suppressed. Accordingly, in the case, a generation of shock by transmitting the torque can be suppressed as well as a stop control of the vehicle by the vehicle stop device and the like described above is not necessary at the time of engine start control.

In the power dividing mechanism 40 of the drive system exemplified in the second embodiment, the sun roller 41 is applied as the first rotating element with which the first motor/generator 20 is coupled, and the first disc 44 is applied as the third rotating element with which the output shaft 60 on the system toward the drive wheel side is coupled. Accordingly, in the exemplification, to increase the rotation speed of the sun roller 41 (that is, the first motor/generator 20) at the time of start control of the engine 10, the first planetary gear ratio ρ1 is made smaller than the first predetermined value as well as the second planetary gear ratio ρ2 is made larger than the second predetermined value on the alignment chart illustrated in FIG. 12. In contrast, the power dividing mechanism may use the first disc 44 as the first rotating element as well as may use the sun roller 41 as the third rotating element. In the case, to increase the rotation speed of the first motor/generator 20 at the time of start control of the engine 10, the first planetary gear ratio ρa1 is made larger than the first predetermined value as well as the second planetary gear ratio ρa2 is made smaller than the second predetermined value on the alignment chart. Here, the first planetary gear ratio ρa1 is a value (rotation ratio) obtained by dividing an absolute value of a relative rotation speed of the first disc 44 to the carrier 43 by an absolute value of a relative rotation speed of the sun roller 41 to the carrier 43. Further, the second planetary gear ratio ρa2 is a value (rotation ratio) obtained by dividing an absolute value of a relative rotation speed of the second disc 45 to the carrier 43 by an absolute value of a relative rotation speed of the sun roller 41 to the carrier 43. The alignment chart in the case, "ρ1" and "ρ2" are read otherwise to "ρa1" and "ρa2", respectively, "MG 1" and "output shaft" are read otherwise in, for example, the alignment chart illustrated in FIG. 12, respectively. In the alignment chart, the rotation speed of the carrier 43 is set so that at least the rotation speed necessary for cranking is kept as well as the rotation speed of the sun roller 41 is reduced than the rotation speed of the carrier 43. Accordingly, the rotation speed of the first disc 44 is increases by controlling the first and second planetary gear ratios ρa1, ρa2. Note that the rotation speed of the sun roller 41 is reduced until it stops at a maximum.

Figure 14:
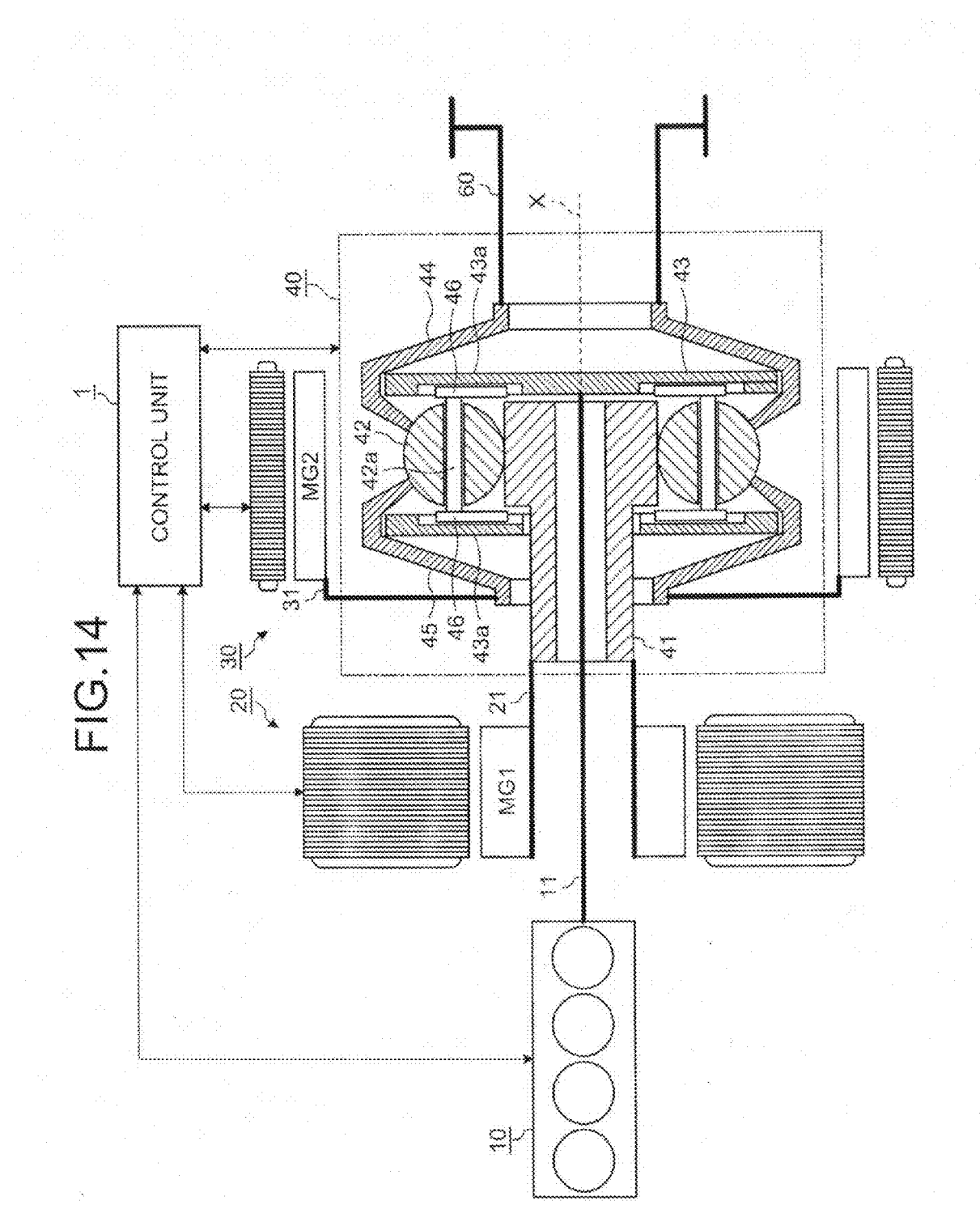
FIG. 14 is a view illustrating another mode of the drive system.

Incidentally, although the output shaft 11 of the engine 10 in the first and second embodiments described above is exemplified assuming that the output shaft 11 is connected to the carrier 43 on the outer peripheral surface side of the sun roller 41 (strictly, on an outer peripheral surface of a support shaft for rotatably supporting the sun roller), in the drive system illustrated in FIG. 1, 6, or 11, the support shaft may be composed of a hollow shaft and the output shaft 11 may be connected to the carrier 43 through a hollow portion. The drive system modified as described above can also achieve an effect similar to that of the drive system which is illustrated in FIG. 1, 6 or 11 and acts as a base of the modification. FIG. 14 shows an example of the modification. A drive system of FIG. 14 improves the drive system illustrated in FIG. 11. In the drive system of FIG. 14, the output shaft 11 is further disposed on the first motor/generator 20 side and connected to the carrier 43 via a center of an annular rotor in the first motor/generator 20. With the configuration, in the drive system, since an input and an output are disposed along a straight line on both sides of the power dividing mechanism 40 located at a center between the input and the output, respective elements can be simply connected, and the drive system is particularly useful as a system for a FR (front engine/rear drive) vehicle. Accordingly, the drive system not only obtains an effect similar to that of the drive system of FIG. 11 but also allows a reduction in size, weight, and cost as a system for the FR vehicle.

Figure 15:
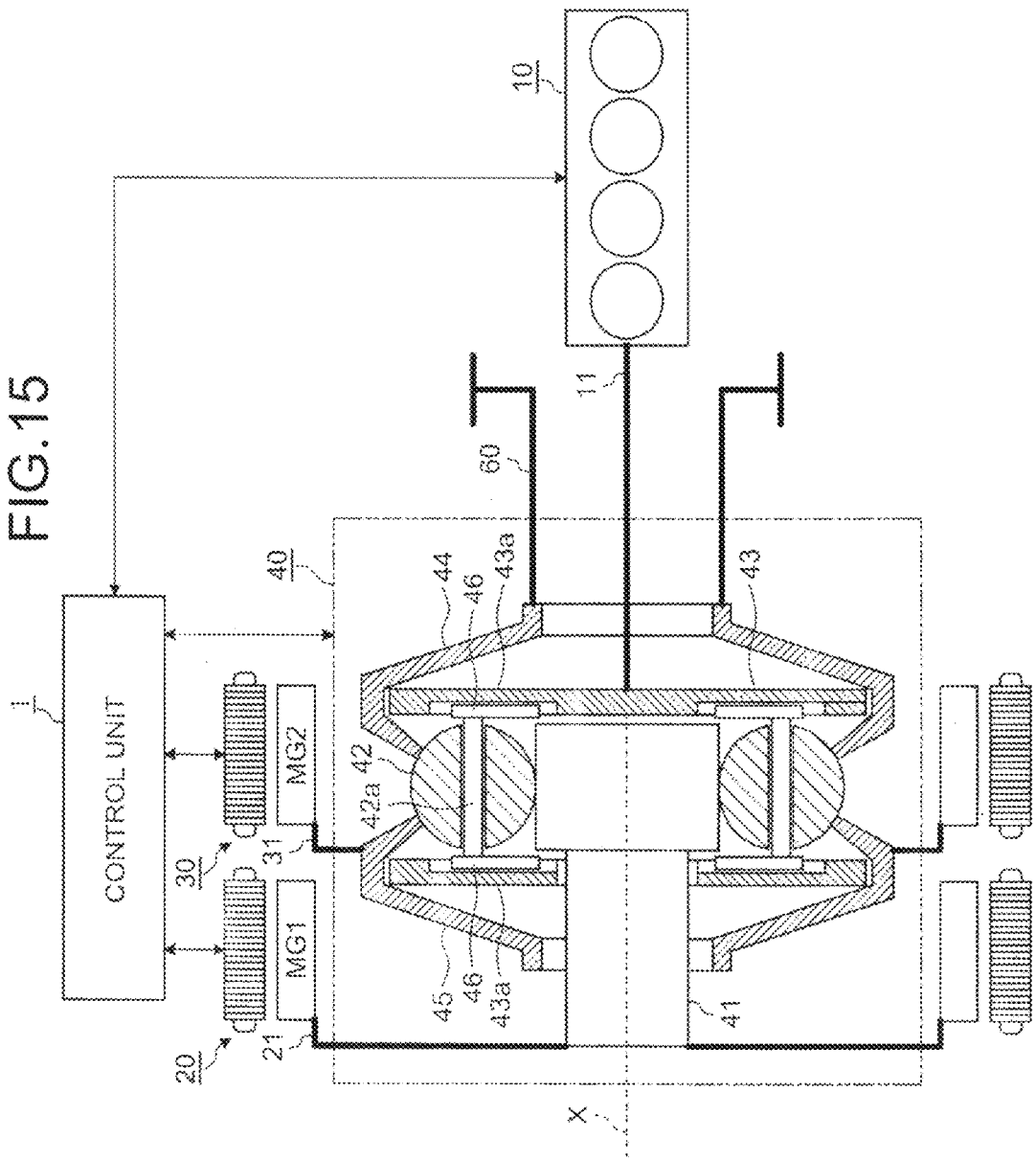
FIG. 15 is a view illustrating other mode of the drive system.

Further, although the first motor/generator 20 of the drive system described above and illustrated in FIG. 1, 6, 11 or 14 is disposed in confrontation with the second disc on the center axis of rotation X, the first motor/generator 20 may be disposed so as to cover the outer peripheral side of the power dividing mechanism 40 in the drive system likewise the second motor/generator 30 illustrated in FIG. 6 and the like. The drive system modified as described above can also achieve an effect similar to that that of the drive system which is illustrated in FIG. 1, 6, 11 or 14 and acts as a base of the modification. Further, since the drive system can configure the second motor/generator 30 compact, an axis length can be shortened, which allows a further reduction in size, weight, and cost. FIG. 15 shows an example of the drive system. The drive system of FIG. 15 improves the drive system illustrated in FIG. 11. In the drive system of FIG. 15, since the second motor/generator 30 is configured also compact, an axis length is further shortened, which allows a reduction in size, weight, and cost.

INDUSTRIAL APPLICABILITY

As described above, the engine start control device of the hybrid vehicle according to the present invention is useful as a technology for suppressing an increase of size of a drive system for starting an engine.

REFERENCE SIGNS LIST

1 CONTROL UNIT
10 ENGINE
11 OUTPUT SHAFT
20 FIRST MOTOR/GENERATOR (FIRST ELECTRIC ROTATING MACHINE)
21 ROTATING SHAFT
30 SECOND MOTOR/GENERATOR (SECOND ELECTRIC ROTATING MACHINE)
31 ROTATING SHAFT
40 POWER DIVIDING MECHANISM
41 SUN ROLLER
42 PLANETARY BALL
42a SUPPORT SHAFT
43 CARRIER
44 FIRST DISC
45 SECOND DISC
46 TILT ARM
51 SECONDARY BATTERY
60 OUTPUT SHAFT
X CENTER AXIS OF ROTATION

The invention claimed is:

1. An engine start control device of a hybrid vehicle, comprising:
a differential mechanism that includes first to third rotating elements with which a rotating shaft of a first electric rotating machine, an output shaft of an engine, and a rotating shaft of a second electric rotating machine are coupled, respectively, a fourth rotating element having a center axis of rotation common to the first to third rotating elements, and rolling members which have a center axis of rotation different from the center axis of rotation as well as can transmit power via contact portions between the first rotating element, the third rotating element, and the fourth rotating element and are held by the second rotating element and by which differential rotating operations between the first to third rotating elements are controlled using an alignment chart on which rotation speeds of the first to third rotating elements are disposed in the sequence of the first rotating element, the second rotating element, and the third rotating element and shown by straight lines and in which a rotation speed axis of the second rotating element internally divides between a rotation speed axis of the first rotating element and a rotation speed axis of the third rotating element by a relation of 1:ρ, wherein
the differential mechanism changes an internally divided ratio of 1:ρ by changing a planetary gear ratio ρ which is obtained by dividing an absolute value of a relative rotation speed of the third rotating element to the second rotating element on the alignment chart by an absolute value of a relative rotation speed of the first rotating element to the second rotating element by changing a tilt angle of the rolling members, and
when the engine is cranked at the time the engine starts by transmitting a rotation of the first electric rotating machine to the output shaft of the engine, the planetary gear ratio ρ is controlled on the alignment chart so that a rotation speed of the first rotating element is increased.

2. The engine start control device of the hybrid vehicle according to claim 1, wherein
when a rotating speed of the first rotating element is increased at the time the rolling members are disposed in contact between a radially outside portion of the first rotating element and radially inside portions of the third rotating element and the fourth rotating element, respectively, the planetary gear ratio ρ is made smaller than a predetermined value on the alignment chart.

3. The engine start control device of the hybrid vehicle according to claim 1, wherein
when the rolling members are disposed in contact between a radially outside portion of the third rotating element and radially inside portions of the first rotating element and the fourth rotating element, respectively, the alignment chart assumes that a rotation speed axis of the second rotating element internally divides between a rotation speed axis of the third rotating element and a rotation speed axis of the first rotating element in a relation of 1:ρa by a planetary gear ratio ρa which is obtained by dividing an absolute value of a relative rotation speed of the first rotating element to the second rotating element by an absolute value of a relative rotation speed of the third rotating element to the second rotating element, and when a rotation speed of the first rotating element is increased, the planetary gear ratio ρa is made larger than a predetermined value on the alignment chart.

4. An engine start control device of a hybrid vehicle, comprising:
a differential mechanism that includes first to fourth rotating elements with which a rotating shaft of a first electric rotating machine, an output shaft of an engine, an output shaft toward a drive wheel side, and a rotating shaft of a second electric rotating machine are coupled, respectively and rolling members which have a center axis of rotation different from a common center axis of rotation in the first to fourth rotating elements, can transmit power via contact portions between the first rotating element, the third rotating element, and the fourth rotating element, and held by the second rotating element and by which differential rotating operations between the first to fourth rotating elements are controlled using an alignment chart on which rotation speeds of the first to fourth rotating elements are disposed in the sequence of the first rotating element, the second rotating element, the third rotating element, and the fourth rotating element and shown by straight lines and in which a rotation speed axis of the second rotating element internally divides between a rotation speed axis of the first rotating element and a rotation speed axis of the third rotating element by a relation of 1:ρ1 and a rotation speed axis of the second rotating element internally divides between the rotation speed axis of the first rotating element and a rotation speed axis of the fourth rotating element by a relation of 1:ρ2, wherein
the differential mechanism changes internally divided ratios of 1:ρ1 and 1:ρ2 by changing a first planetary gear ratio ρ1 which is obtained by dividing an absolute value of a relative rotation speed of the third rotating element to the second rotating element by an absolute value of a relative rotation of the first rotating element to the second rotating element and a second planetary gear ratio ρ2 which is obtained by dividing an absolute value of a relative rotation speed of the fourth rotating element to the second rotating element by an absolute value of a relative rotation of the first rotating element to the second rotating element on the alignment chart by changing a tilt angle of the rolling members, and
when the engine is cranked at the time the engine starts by transmitting a rotation of the first electric rotating machine to the output shaft of the engine, the first and second planetary gear ratios ρ1, ρ2 are controlled on the alignment chart so that a rotation speed of the first rotating element is increased.

5. The engine start control device of the hybrid vehicle according to claim 4, wherein
when a rotation speed of the first rotating element is increased at the time the rolling members are disposed in contact with a radially outside portion of the first rotating element and radially inside portions of the third rotating element and the fourth rotating element, the first planetary gear ratio ρ1 is made smaller than a predetermined value and the second planetary gear ratio ρ2 is made larger than a predetermined value on the alignment chart.

6. The engine start control device of the hybrid vehicle according to claim 4, wherein
when the rolling members are disposed in contact between a radially outside portion of the third rotating element and radially inside portions of the first rotating element and the fourth rotating element, respectively, the alignment chart disposes rotation speeds of the first to fourth rotating elements in the sequence of the third rotating element, the second rotating element, the first rotating element, and the fourth rotating element and shows the rotating elements by straight lines and assumes that a rotation speed axis of the second rotating element internally divides between a rotation speed axis of the third rotating element and a rotation speed axis of the first rotating element in a relation of 1:ρa1 by a first planetary gear ratio ρa1 which is obtained by dividing an absolute value of a relative rotation speed of the first rotating element to the second rotating element by an absolute value of a relative rotation speed of the third rotating element to the second rotating element and a rotation speed axis of the second rotating element internally divides between a rotation speed axis of the third rotating element and a rotation speed axis of the fourth rotating element in a relation 1:ρa2 by a second planetary gear ratio ρa2 which is obtained by dividing an absolute value of a relative rotation speed of the fourth rotating element to the second rotating element by an absolute value of a relative rotation speed of the third rotating element to the second rotating element, and when a rotation speed of the first rotating element is increased, the first planetary gear ratio ρa1 is made larger than a predetermined value and the second planetary gear ratio ρa2 is made smaller than a predetermined value.

7. The engine start control device of the hybrid vehicle according to claim 1, wherein
the differential mechanism includes a sun roller as the first rotating element, a carrier as the second rotating element, a first disc as the third rotating element, a second disc as the fourth rotating element, and planetary balls as the rolling members.

8. The engine start control device of the hybrid vehicle according to claim 1, wherein
the differential mechanism includes a first disc as the first rotating element, a carrier as the second rotating element, a sun roller as the third rotating element, a second disc as the fourth rotating element, and planetary balls as the rolling members.

9. The engine start control device of the hybrid vehicle according to claim 2, wherein
when the cranking is executed, a rotation speed of the second rotating element is set to at least a rotation speed necessary for cranking as well as a rotation speed of the third rotating element is reduced to 0 at the maximum on the alignment chart.

10. The engine start control device of the hybrid vehicle according to claim 1, wherein
when the cranking is executed, the rotation ratio is controlled when a temperature of a secondary battery as a power supply source to the first electric rotating machine is a low temperature or a high temperature than when an ordinary temperature.

11. The engine start control device of the hybrid vehicle according to claim 2, wherein
the differential mechanism includes a sun roller as the first rotating element, a carrier as the second rotating element, a first disc as the third rotating element, a second disc as the fourth rotating element, and planetary balls as the rolling members.

12. The engine start control device of the hybrid vehicle according to claim 4, wherein
the differential mechanism includes a sun roller as the first rotating element, a carrier as the second rotating element, a first disc as the third rotating element, a second disc as the fourth rotating element, and planetary balls as the rolling members.

13. The engine start control device of the hybrid vehicle according to claim 5, wherein
the differential mechanism includes a sun roller as the first rotating element, a carrier as the second rotating element, a first disc as the third rotating element, a second disc as the fourth rotating element, and planetary balls as the rolling members.

14. The engine start control device of the hybrid vehicle according to claim 3, wherein
the differential mechanism includes a first disc as the first rotating element, a carrier as the second rotating element, a sun roller as the third rotating element, a second disc as the fourth rotating element, and planetary balls as the rolling members.

15. The engine start control device of the hybrid vehicle according to claim 4, wherein
the differential mechanism includes a first disc as the first rotating element, a carrier as the second rotating element, a sun roller as the third rotating element, a second disc as the fourth rotating element, and planetary balls as the rolling members.

16. The engine start control device of the hybrid vehicle according to claim 6, wherein
the differential mechanism includes a first disc as the first rotating element, a carrier as the second rotating element, a sun roller as the third rotating element, a second disc as the fourth rotating element, and planetary balls as the rolling members.

17. The engine start control device of the hybrid vehicle according to claim 3, wherein
when the cranking is executed, a rotation speed of the second rotating element is set to at least a rotation speed necessary for cranking as well as a rotation speed of the third rotating element is reduced to 0 at the maximum on the alignment chart.

18. The engine start control device of the hybrid vehicle according to claim 5, wherein
when the cranking is executed, a rotation speed of the second rotating element is set to at least a rotation speed necessary for cranking as well as a rotation speed of the third rotating element is reduced to 0 at the maximum on the alignment chart.

19. The engine start control device of the hybrid vehicle according to claim 6, wherein
when the cranking is executed, a rotation speed of the second rotating element is set to at least a rotation speed necessary for cranking as well as a rotation speed of the third rotating element is reduced to 0 at the maximum on the alignment chart.

20. The engine start control device of the hybrid vehicle according to claim 2, wherein
when the cranking is executed, the rotation ratio is controlled when a temperature of a secondary battery as a power supply source to the first electric rotating machine is a low temperature or a high temperature than when an ordinary temperature.

* * * * *